US012490752B2

United States Patent
Merrill et al.

(10) Patent No.: US 12,490,752 B2
(45) Date of Patent: Dec. 9, 2025

(54) METHODS AND SYSTEMS OF MAKING CHEESE FORMS

(71) Applicant: Leprino Foods Company, Denver, CO (US)

(72) Inventors: Richard K. Merrill, Denver, CO (US); Paulos Tesfe, Denver, CO (US)

(73) Assignee: Leprino Foods Company, Denver, CO (US)

( * ) Notice: Subject to any disclaimer, the term of this patent is extended or adjusted under 35 U.S.C. 154(b) by 861 days.

(21) Appl. No.: 15/659,212

(22) Filed: Jul. 25, 2017

(65) Prior Publication Data

US 2018/0027837 A1 Feb. 1, 2018

Related U.S. Application Data

(60) Provisional application No. 62/368,795, filed on Jul. 29, 2016.

(51) Int. Cl.
*A23C 19/084* (2006.01)
*A23C 19/06* (2006.01)
(Continued)

(52) U.S. Cl.
CPC ............ *A23C 19/084* (2013.01); *A23C 19/06* (2013.01); *A23C 19/068* (2013.01);
(Continued)

(58) Field of Classification Search
CPC ......... A23C 19/84; A23C 19/06; A23C 19/68; A23C 19/684; A23C 19/08; A23C 19/09; A23C 19/917; A23C 19/00
(Continued)

(56) References Cited

U.S. PATENT DOCUMENTS 3,713,220 A   1/1973   Kielsmeier et al.
3,961,077 A   6/1976   Kielsmeier
(Continued)

FOREIGN PATENT DOCUMENTS

EP    0 557 425    *  1/1993   ............... A21C 9/04
WO    2013/039410 A1   3/2013

OTHER PUBLICATIONS

Kate Williams, Bake Homemade Cheese Crackers for Holiday Gift, KQED, 2014, accessed at https://www.kqed.org/bayareabites/90996/bake-homemade-cheese-crackers-for-holiday-gift-giving.*
(Continued)

*Primary Examiner* — Nikki H. Dees
*Assistant Examiner* — Philip A Dubois
(74) *Attorney, Agent, or Firm* — Kilpatrick Townsend & Stockton LLP

(57) ABSTRACT

Embodiments may include a method of making a cheese shape. The method may include providing a cheese-shaping system. The cheese-shaping system may include at least a first chilled roller belt. The method may also include supplying a cheese mass in molten form to the first chilled roller belt. A cheese sheet may then be formed on the first chilled roller belt. The method may further include cooling the cheese sheet through contact with the first chilled roller belt. In addition, the method may include forming and removing the cheese shape from the cooled cheese sheet. Furthermore, the method may include applying a liquid application to the cheese shape.

29 Claims, 14 Drawing Sheets

(51) Int. Cl.
*A23C 19/068* (2006.01)
*A23C 19/08* (2006.01)
*A23C 19/09* (2006.01)
*A23C 19/00* (2006.01)

(52) U.S. Cl.
CPC .......... *A23C 19/0684* (2013.01); *A23C 19/08* (2013.01); *A23C 19/09* (2013.01); *A23C 19/0917* (2013.01); *A23C 19/00* (2013.01)

(58) Field of Classification Search
USPC ....................................................... 426/582
See application file for complete search history.

(56) References Cited

U.S. PATENT DOCUMENTS

| | | | |
|---|---|---|---|
| 5,240,731 A * | 8/1993 | Bornhorst | A21C 11/04 264/153 |
| 5,902,625 A | 5/1999 | Barz et al. | |
| 7,579,033 B2 | 8/2009 | Merrill et al. | |
| 7,585,537 B2 | 9/2009 | Merrill et al. | |
| 7,651,715 B2 | 1/2010 | Merrill et al. | |
| 8,021,704 B2 | 9/2011 | Merrill et al. | |
| 8,603,554 B2 | 12/2013 | Merrill et al. | |
| 9,185,876 B2 | 11/2015 | Kuhn et al. | |
| 2002/0127301 A1* | 9/2002 | Thakar | A23C 19/0684 426/61 |
| 2005/0158442 A1 | 7/2005 | Westerman et al. | |
| 2009/0117228 A1 | 5/2009 | Merrill | |
| 2014/0242248 A1* | 8/2014 | Zietlow | A23C 19/093 426/582 |

OTHER PUBLICATIONS

PCT/US2017/043843 received an International Search Report and Written Opinion mailed Nov. 28, 2017, 14 pages.

PCT/US2017/043843 received an International Preliminary Report on Patentability mailed Feb. 7, 2019, 10 pages.

* cited by examiner

METHODS AND SYSTEMS OF MAKING CHEESE FORMS

CROSS REFERENCES TO RELATED APPLICATIONS

This application is a nonprovisional of, and claims the benefit of priority to U.S. Provisional Patent Application No. 62/368,795 filed Jul. 29, 2016, the entire content of which is incorporated herein by reference for all purposes.

BACKGROUND

Cheese is a popular and versatile ingredient used in a wide variety of foods. Two well-known types of food that commonly include cheese are pizza and sandwiches. These two types of foods are so popular that a single restaurant can fulfill hundreds, sometimes thousands, of orders a day. Fulfilling this many orders in such a short period requires high levels of speed and precision incorporating the cheese into the food. Too much variation in the amount and distribution of cheese from one order to the next can create inconsistent quality and unpredictable cost and supply requirements.

Pizza makers have controlled the quantity and distribution of cheese on a pizza using measuring cups, sprinkling devices, and depositors that permit the maker to distribute a well-defined amount of cheese shreds on the pizza. However, inconsistent sizes of the cheese shreds, as well as clumping of the shreds, can lead to an uneven distribution of cheese across the pizza, which may lead to more cheese being applied to fill in gaps and higher cheese usage than desired by the restaurant. The measuring and application process also leads to some dropped and discarded shreds, which can add up to significant product loss when multiplied over thousands of pizzas.

Sandwich makers typically use whole slices of cheese instead of cheese shreds, and therefore face fewer concerns measuring and distributing precise quantities of cheese on their sandwiches. However, the cheese slices are typically shipped stacked on top of each other, and sandwich makers have to carefully peel the slices apart before placing them on the sandwiches. Slices that are peeled apart too quickly and with too much force are prone to tearing, which creates uneven amounts and coverage of cheese on the sandwich. In many instances, the sandwich maker discards the torn cheese slice which creates significant waste. In response, cheesemakers have put wax paper, plastic wrap, or some other kind of separation barrier between individual cheese slices to keep them from sticking together. Unfortunately, this paper or plastic is discarded after the slices are separated, creating additional waste.

There have been attempts to eliminate the problems applying shredded cheese to pizza by forming the pizza cheese into a one-piece disc that can be dropped on the pizza. Unfortunately, those methods were often difficult to integrate with traditional methods of making pasta filata cheeses, like mozzarella cheese, that first formed the cheese into square or rectangular blocks that had to be cut into more cylindrical shapes before being sliced into the discs. The additional cutting and shaping added significant time, cost and product loss to cheese manufacturing.

BRIEF SUMMARY

Methods and systems described herein result in superior cheese manufacturing methods and products. Methods and systems may also result in more efficient production and use of equipment and facility floor space. Methods may not include a brining step and may allow for producing low sodium cheese. Cheese shapes for use in food may be produced efficiently and consistently by methods described herein, with minimal scraps when forming the cheese shapes. Total scraps may be reduced to zero. Cheese shapes may be frozen and then stacked. These cheese shapes may not require a separation membrane in order to be separated. These cheese shapes may be applied to pizza dough or other food thawed or frozen. When a cheese shape described herein is cooked on pizza, the cheese may have preferred blister quality (percentage and/or size). Cheese shapes may allow for more precise and consistent portion control and may decrease preparation time for the food product.

Embodiments may include a method of making a cheese shape. The method may include providing a cheese-shaping system. The cheese-shaping system may include at least a first chilled roller belt positioned in a vertical or horizontal fashion. The method may also include supplying a cheese mass (e.g., a molten cheese mass) to the first chilled roller belt. A cheese sheet may then be formed on the first chilled roller belt. The method may further include cooling the cheese sheet through contact with the first chilled roller belt. In addition, the method may include forming and removing the cheese shape from the cooled cheese sheet. Furthermore, the method may include applying a liquid application to the cheese shape.

Some embodiments may include a method of making cheese shapes. The method may include supplying a pasta filata cheese mass to an extruder which distributes the pasta filata cheese mass to a gap formed between two chilled roller belts. The two chilled roller belts may be aligned substantially parallel to each other. The method may also include moving or pulling or rolling the pasta filata cheese mass through the gap to form a cheese sheet. The method may further include cooling the cheese sheet through contact with the two chilled roller belts. Cheese shapes may be formed and removed from the cheese sheet. The method may additionally include docking the cheese shapes to form holes in the cheese sheet or shapes. The size of the holes may range from pinhole size to $\frac{1}{32}$ inch (0.79 mm). A docker for pizza dough may have 1 mm diameter tips. The method may also include freezing the cheese shapes to form frozen cheese shapes. A liquid application may be applied to the cheese shapes or the frozen cheese shapes. Furthermore, the method may include stacking the frozen cheese shapes, where the stacked cheese shapes do not tear when pulled apart.

Embodiments may include a system to make a cheese shape. The system may include a pair of roller belts that form a gap between the belts. In some embodiments, the system may include three or four roller belts. The roller belts may be aligned substantially parallel to each other. The system may also include a belt chilling subsystem that chills the pair of roller belts below room temperature. The cheese sheet may be formed and chilled from a molten cheese mass pulled through the gap between the pair of roller belts. The system may further include a cheese shape forming subsystem that forms the cheese shapes in a cheese sheet. In addition, the system may include a docking subsystem to form a plurality of holes in the cheese shape.

Some embodiments may include a cheese product. The cheese product may include a pasta filata cheese. The cheese product may also include a liquid application applied to the pasta filata cheese. Furthermore, the pasta filata cheese may define a plurality of apertures.

Embodiments may include a method of maintaining cheese portion control and eliminating cheese waste from making a pizza pie. The method may include providing a cheese in the form of a cheese disc having a generally uniform thickness and size. The method may also include placing the cheese disc on pizza dough to make the pizza pie. A liquid application may be disposed on the cheese disc. The cheese disc may define a plurality of apertures.

Embodiments may include an uncooked pizza pie. The uncooked pizza pie may include pizza dough and a cheese in the form of a cheese disc having a generally uniform thickness and size. The uncooked pizza pie may also include a liquid application applied to the cheese disc. The cheese disc may be disposed on the pizza dough. The cheese disc may define a plurality of apertures.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION

Figure 1:
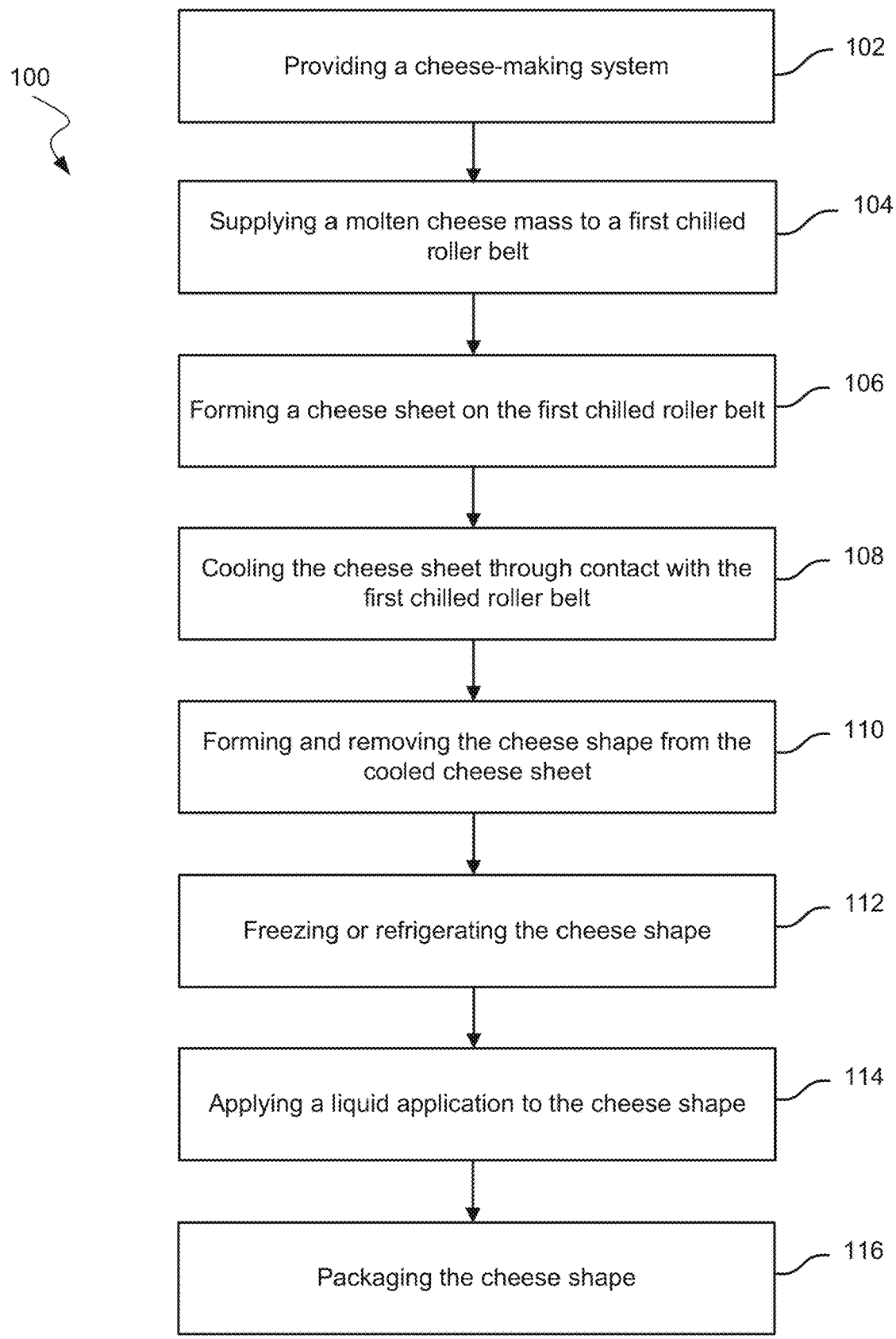
FIG. 1 is a flowchart showing selected steps in a method of making cheese shapes according to embodiments of the present technology.

Conventional methods of making a pizza may include applying shredded cheese onto a pizza. Precise and consistent control over the quantity and coverage of cheese on a pizza is often difficult. The total volume of shredded cheese may be measured for each pizza. However, applying the shredded cheese to a pizza may not always result in uniform coverage. Shredded cheese may be applied by sprinkling the cheese onto a pizza. Ensuring uniform and consistent coverage of the cheese over the pizza usually requires individual judgment on the appearance of the cheese coverage and sprinkling over the same areas of the pizza multiple times. In some cases, shredded cheese may be moved from one area of a pizza to another area of the pizza to even out coverage. In other cases additional cheese may be added to fill in gaps in cheese coverage on the pizza. A pizza with non-uniform coverage of cheese may be aesthetically unpleasing or may not taste right to a pizza consumer. In addition, cheese coverage may affect blistering of the cheese after cooking, which affects the desirability and pizza eating experience.

One way to improve the quantity and uniformity of cheese on a pizza may be to apply a cheese disc instead of shredded cheese. Because the dimensions of each cheese disc can be controlled, each pizza would get the same or similar amount of cheese. In addition, the cheese disc could be a consistent thickness throughout, and as a result, the pizza would have a uniform spread of cheese over the surface of the pizza crust. Furthermore, because the cheese is already fused together in a disc, the cheese may have a longer stretch after cooking, which can be as long as 2 to 3 feet. Moreover, cheese discs may allow for docking and liquid application, which may improve the quality of cheese after baking. Cheese shapes, other than discs, may also allow for improved quantity and consistency in other applications, for example for applying to sandwiches. Cheese slices for sandwiches' are commonly produced by first forming a block of cheese, aging the cheese block and then either cutting slices from the cheese block or melting the cheese block, adding ingredient to make a process cheese and forming the process cheese into slices. Whether cut form a block or formed into process cheese these practices require additional steps and lead to cheese scrap and loss as opposed to the methods and systems described in this application which achieve natural cheese (not process cheese) slices in a single step thus eliminating the need to first form the cheese into blocks.

Conventional methods and systems of making cheese may not be well suited to making cheese discs or other shapes. Conventional methods of making cheese often include forming a desired shape (e.g., a cylinder of cheese) by molding. After cooling the cheese in the mold, which is an inefficient process, the cheese may be sliced to form a disc or several discs. There may be a significant amount of scrap cheese from the end of the mold. In some cases, about 20% of cheese may be scrapped. Furthermore, the discs made this way will tear easily for lack of continuous longer fiber structure. Cheese slices or discs of cheese may also be cut from preformed blocks of cheese. In these cases, scrap cheese may be generated, which results in inefficient utilization of cheese. Embodiments described herein include superior cheese manufacturing methods and systems to produce cheese shapes.

I. Methods and Systems of Making a Cheese Mass

The present methods include supplying a cheese mass to a system that cools and forms the cheese mass into cheese shapes. Before describing the methods and systems for making the cheese shapes, methods and systems of making the cheese mass are discussed. Those of skill in the art will appreciate that any of the discussed methods and systems for making a cheese mass may be used to supply the cheese mass for the present methods and systems of making a cheese shapes. In some embodiments, the equipment used to make the cheese mass is directly connected to the equipment used to make the cheese shapes to make one continuous system. Additional embodiments have separate systems for (i) making the cheese mass and (ii) forming the cheese mass into cheese shapes.

The cheese mass can be formed by (i) providing a source of dairy proteins, (ii) forming the dairy proteins into a cheese curd, and (iii) forming the cheese curd into the cheese mass. It should be appreciated from the discussion below that a variety of ingredients and processes can be chosen to accomplish each of parts (i)-(iii) to form the cheese mass.

A. Providing a Source of Dairy Proteins

The cheese mass is formed from dairy proteins that are modified to form cheese curds, which are further treated to make the cheese mass. The dairy proteins may be sourced from the milk from one or more of cows, goats, sheep, and water buffalo, among other milk producing animals. In most instances, the dairy proteins are sourced from cow's milk, and when the term "milk" is used in this Application it refers to cow's milk unless otherwise stated.

In most instances, the raw milk directly produced by the animal is pasteurized by a heat treatment to form pasteurized milk that has fewer spoilage organisms, and thus a longer storage life, than the raw milk. Embodiments of the pasteurization process include heating the raw milk to a temperature of at least 145° F. (e.g., about 145° F.) for period of time of at least 30 minutes (e.g., about 30 minutes). Additional embodiments include high-temperature-short-time pasteurization at a temperature of at least 161° F. (e.g., about 161° F.) for a time of at least 15 seconds (e.g., about 15 seconds).

Embodiments include standardizing the milk to make a standardized milk with a target weight ratio of proteins to fats in the milk. This target ratio can be achieved by one or both of (i) changing (e.g., increasing) the amount of proteins in the milk and (ii) changing the amount of milkfat in the milk. In many instances, the milk taken directly from the milk producing animal has a high concentration of milkfats, and too low a fat to protein ratio for the final cheese product. In these instances, the standardization process includes (i) increasing the amount of protein in the milk by, for example, adding skim milk, non-fat dry milk powder or reconstituted NFDM, and/or other sources of dairy proteins to the milk, and/or (ii) decreasing the amount of milkfats by, for example, separating cream from the milk.

The target weight ratio of proteins to fat in the standardized milk is commonly set to achieve a percentage level of fat-on-a-dry-basis (FDB) in the final cheese product. The FDB level is calculated as the weight ratio of the weight percentage fat to the weight percentage of dry matter in the final cheese product. Exemplary FDB levels include (i) greater that 45% for low-moisture whole-milk (LMWM) mozzarella cheese, and (ii) from 30% to 45% for low-moisture-part-skim (LMPS) mozzarella cheese.

While standardization processes adjust the weight ratio of proteins to fats in milk to a target level, the milk used in the present methods of making a cheese mass may also have a specific milkfat concentration. For example, the milk may be whole milk with a milk fat content of 3.25 wt. % or more; reduced fat milk with a milk fat content of 2 wt. % to greater than 1 wt. % (typically about 2 wt. % milk fat); lowfat milk with a milk fat content of 1 wt. % milk fat to greater than 0.5 wt. % (typically about 1 wt. % milk fat), or skim milk, also called "fat-free" milk, with a milk fat content of 0.5 wt. % or less.

In addition to the proteins and fats, the milk also includes dairy carbohydrates. The primary dairy carbohydrate is lactose, a disaccharide of D-glucose and D-galactose. The carbohydrate level in the milk typically ranges from 4 wt. % to 6 wt. %, and more specifically the milk typically has a lactose content ranging from about 4.5 to about 5 wt. %). In some embodiments, the lactose level in the milk is not reduced prior to forming the cheese curd. In additional embodiments, at least some of the lactose in the milk may be removed before and/or during the formation of the milk's dairy proteins into cheese curds. Lactose removal methods include (i) the exposure of the milk to lactase enzymes that convert the lactose into its constituent monosaccharides, (ii) chromatographic methods that use resins with an affinity for the lactose or other milk constituents to physically separate the lactose, and (iii) membrane filtration methods that filter the lactose from other dairy constituents, among other lactose removal methods.

In still additional embodiments, at least a portion of the lactose in the milk may be enzymatically converted into lactobionic acid (LBA) and salts thereof. This is accomplished by added one or more oxidoreductase enzymes to the milk that enzymatically convert the lactose and other reducing sugars present to aldobionate products such as lactobionic acid. The enzymatic conversion process also requires molecular oxygen ($O_2$), and the Applicants have discovered that conversion times can be significantly shortened from a period of 24 hours or more to a period of 2 hours or less by introducing purified oxygen with concentrations greater than that found in air (i.e., about 21 vol. %). An exemplary volume percentage range of $O_2$ in the purified oxygen introduced to the milk is at least 50 vol. %, or an even higher minimum mol. % $O_2$ level of 60 vol. %, 65 vol. %, 70 vol. %, 75 vol. %, 80 vol. %, 85 vol. %, 90 vol. %, 95 vol. %, 96 vol. %, 97 vol. %, 98 vol. % and 99 vol %, or more, among other ranges. Using purified oxygen with the above-described vol. % $O_2$ shortens the conversion times significantly when compared to introducing an equivalent flow of filtered air to the milk. As noted below, the oxidoreductase enzymes may be added at other times during the processes of making the cheese mass, such as during the formation of the cheese curd, and/or during the formation of the cheese curd into the cheese mass. It may also be added to the cheese mass before it is shaped into cheese shapes, and after the formation of the cheese shape. Additional details about the enzymatic conversion of lactose and other reducing sugars to lactobionic acid and other aldobionate products can be found in co-assigned U.S. Pat. No. 8,021,704 issued Sep. 20, 2011, and titled "FOOD INGREDIENTS AND FOOD PRODUCTS TREATED WITH AN OXIDOREDUCTASE AND METHODS FOR PREPARING SUCH FOOD INGREDIENTS AND FOOD PRODUCTS" the entire contents of which are hereby incorporated by reference for all purposes.

In addition to the proteins, fats, and carbohydrates, the milk includes water, vitamins, and minerals. Specific dairy proteins include the casein proteins such as αs1-casein, αs2-casein, β-casein, and κ-casein. The dairy proteins also include whey proteins such as β-lactoglobulin, α-lactalbumin, bovine serum albumin, and immunoglobulins. Dairy fats, also called milk fats, are primarily composed of triglycerides that are mainly present as globules in an oil-in-water emulsion in the milk. As noted above, the primary dairy carbohydrate is lactose. The vitamins include the water-soluble vitamins including thiamin (vitamin B1), riboflavin (vitamin B2), niacin (vitamin B3), antothenic acid (vitamin B5), pyridoxine (vitamin B6), coblamin (vitamin B12), ascorbic acid (vitamin C), and folic acid (vitamin B9). The vitamins also include the fat soluble vitamins including vitamin A, vitamin D, vitamin E, and vitamin K. In some embodiments, the milk may be a fortified milk that has added amounts of vitamin A and/or vitamin D. The dairy minerals include calcium, magnesium, phosphorous, potassium, selenium, and zinc.

Examples of milk may also include milk that is reconstituted from one or more types of milk powder mixed with water. These milk powders include dry whole milk, reduced fat dry milk, lowfat dry milk, and non-fat dry milk. The milk powders are produced by removing substantially all the water from a starting milk. For example, dry whole milk is made by removing the water in from a starting whole milk, and non-fat dry milk is made by removing the water from a starting skim milk. The water may be removed from the starting milk though one or more processes including membrane filtration, evaporation, and spray drying, among other water removal processes.

For examples of both reconstituted and unreconstituted milk, the milk may include solids-not-fat ("SNF") at level of about 8.25 wt. % or more. For example, the milk may have SNF at levels ranging from about 8.25 wt. % to about 12 wt. %. In some embodiments, the milk may be evaporated milk, also called condensed milk, that has a portion of its water content removed, which increases the SNF levels of the milk. In additional embodiments, a reconstituted milk may be mixed with less water to form a reconstituted milk, with a higher SNF level. In still more embodiments, milk powders and/or concentrates may be added to milk to increase the SNF level. Still further embodiments include milk that has been filtered to concentrate the milk proteins. For example, the milk may undergo microfiltration (MF) and/or ultrafiltration to remove a portion of the water from the milk. For all these embodiments, the increased SNF levels in the milk may range from about 15 wt. % or more, or have an even higher minimum SNF level of about 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, 40 wt. %, 41 wt. %, 42 wt. %, 43 wt. %, 44 wt. %, 45 wt. %, 46 wt. %, 47 wt. %, 48 wt. %, 49 wt. %, or 50 wt. %, or more.

The dairy proteins may be sourced from dairy products that are derived from milk. For example, the dairy proteins may be sourced from a milk protein concentrate (MPC) that has a dairy protein concentration ranging from about 40 wt. % to about 90 wt. %. In additional examples, the dairy proteins may be sourced from a milk protein isolate (MPI) that has a protein concentration of about 90 wt. % or more. In some embodiments, the dairy proteins are sourced from a combination of milk and a more concentrated source of dairy proteins such as MPC or MPI.

Examples of sources of dairy proteins also include fortified milk that is a combination of (i) milk sourced directly from a milk producing animal (e.g., pasteurized cow's milk) and (ii) one or more of milk powders (e.g., NFDM powder), reconstituted milk (e.g., reconstituted NFDM), evaporated milk, MPCs, and MPIs, among other sources of dairy proteins. In some embodiments, milkfats may also be added to the milk to achieve a target weight ratio of protein-to-fat. Exemplary methods of increasing the milkfat content of the milk include adding cream and/or whole milk to the milk as part of forming the fortified milk.

B. Forming Dairy Proteins into Cheese Curd

The formation of cheese curd involves the modification of the dairy proteins and their surrounding environment to permit the coagulation, also called gelation, of the proteins into curd. More specifically, curd formation involves the modification of the casein proteins and their surrounding environment to facilitate their coagulation into curd. As noted above, the casein proteins in cow's milk include αs1-casein, αs2-casein, β-casein, and κ-casein. The αs1-casein, αs2-casein and β-casein proteins naturally assemble into protein micelles that have a hydrophobic interior and hydrophilic outer surface in contact with the water. The κ-casein has a hydrophobic portion, called para-κ-casein, which extends into the hydrophobic interior of the casein micelles, but also has a long negatively-charged hydrophilic portion, called caseinomacropeptide or CMP, that extends into the surrounding water. The negatively charged CMP branches repulse each other and consequently hinder the aggregation of the casein micelles into a curd coagulum. One method for facilitating curd coagulation involves enzymatically hydrolyzing the CMP portion of the κ-caseins from the para-κ-casein portion to remove the repulsive CMP branches between adjacent casein micelles. This removes a barrier to the micelles coagulating into a curd.

Coagulation of the casein micelles is also affected by the presence of calcium ions that crosslink the para-κ-casein groups formed by the hydrolysis of the κ-casein. The Applicant has previously described the addition of sequestrants for calcium to milk that decrease the concentration of free calcium ions which delays or prevents the coagulation of enzyme hydrolyzed casein micelles into a curd coagulum. In some embodiments, the water is removed from the enzyme-hydrolyzed casein proteins to form a milk powder that may be used as an ingredient in the making of the cheese mass. Additional description of the methods of making and using these uncoagulated, enzyme-hydrolyzed milk proteins can be found in co-assigned U.S. patent application Ser. No. 11/936,624 filed Nov. 7, 2007, and titled "NON-FAT DRY MILK PRODUCTION PROCESSES FOR CHEESEMAKING" the entire contents of which are hereby incorporated by reference for all purposes.

i. Vat Processes for Forming Cheese Curd

Embodiments of forming the cheese curd include methods that form a single large coagulum of curd in a container. These methods include providing milk or other source of dairy proteins to a vat, tub, or other type of container. The milk is then acidified to lower the pH of the milk from its starting pH, which is normally about 6.4 to about 6.8. During the initial formation of the curd coagulum, the acidified milk typically has a pH ranging from about 6.0 to about 6.5 (e.g., 6.2 to 6.5), but the curd usually becomes more acidic as the curd coagulum is formed into cheese curd. The rate and extent of curd acidification can be set by the target pH of the cheese curd. For example, if the cheese curd is used to make a pasta filata cheese mass, the target pH of the cheese curd is about 5.1 to about 5.5 (e.g., 5.2 to 5.4) when it is ready to be heated, kneaded and stretched into a pasta filata cheese mass.

In some embodiments, the milk is acidified by directly adding a food-grade acid to the milk. Exemplary food-grade organic acids include acetic acid (a.k.a. vinegar), citric acid, lactic acid, and glucoso-delta-lactone (GDL) among others. Exemplary food-grade inorganic acids include hydrochloric acid, phosphoric acid, and sulfuric acid, among others. In more embodiments, the milk is acidified by introducing a starter culture that includes lactic acid producing bacteria that metabolize lactose into the lactic acid that lowers the pH of the milk and normally remains active in the curd to continue lowering its pH. Exemplary lactic acid producing bacteria include thermophilic bacteria such as *Streptococcus* bacteria and *Lactobacillus* bacteria. Specific examples include *Streptococcus thermolphilus, Lactobacillus bulgaricus* and *Lactobacillus helveticus*. Additional details on the use of starter cultures in the acidification of milk and the resulting curd can be found in co-assigned U.S. Pat. No. 3,961,077 issued Jun. 1, 1976, and titled "PASTA FILATA CHEESE PRODUCTION BY STORED CURD PROCESS" the entire contents of which are hereby incorporated by reference for all purposes.

Following the start of acidification, a coagulating enzyme may be introduced to modify the milk's casein proteins so they can be formed into a curd coagulum. Exemplary coagulating enzymes include the complex of enzymes known as rennet, and the casein modification enzyme in the rennet complex known as chymosin. Rennet may be sourced from the stomachs of ruminant mammals, where the rennet enzyme complex was originally discovered. Chymosin enzymes may be sourced as a fermentation product of specific bacteria, fungi, and yeasts. Exemplary fermentation-produced chymosins (FPCs) can be made from *Aspergillus niger* and *Kluyveromyces lactis*, among other chymosin sources. Embodiments include adding the coagulating enzyme to the milk at concentrations ranging from of 1 part by weight (pbw) coagulating enzyme per about 5000 pbw of the milk, to 1 pbw of the coagulating enzyme per about 50,000 pbw of the milk. Additional embodiments add the coagulating enzyme to the milk at concentrations ranging from 1 pbw of the coagulating enzyme per about 15,000 pbw of the milk, to 1 pbw of the coagulating enzyme per about 20,000 pbw of the milk.

In some embodiments, an additional source of calcium ions may be added to the milk to facilitate the rate and extent of the coagulation of the milk proteins into the curd. Exemplary sources of these calcium ions include calcium chloride ($CaCl_2$), which may be added as a powdered salt or an aqueous solution to the milk. Exemplary concentration ranges of calcium chloride in the milk include about 0.2 g/L to about 1 g/L.

Following the inoculation of the milk with the starter culture of acid producing bacteria and coagulating enzymes in the milk container, the milk proteins will spontaneously coagulate into a curd coagulum. The curd coagulum may then be cut into pieces, which causes whey proteins and other liquids bound in the curd coagulum to start being expunged in a process called syneresis. The syneresis of the whey and other liquids is also facilitated by the tendency of the curd pieces to shrink in volume.

The mixture of cut curd pieces and the liquid whey, water, and other dairy components expunged from the curd are then cooked (i.e., heated) to further the activity of coagulation enzymes as well as the growth and activity of the acidifying bacteria from the starter culture. Syneresis of the whey and other liquids can also continue during the cooking step. Exemplary curd cooking temperatures range from about 85° F. to about 125° F. (e.g., 100° F. to 120° F.), and cooking times range from about 5 minutes to about 1 hour (e.g., 15 minutes to 45 minutes). In some embodiments, the endpoint of the curd cooking stage is set by a predetermined pH for the cheese curds that are produced. For example, cheese curds that are used to make a pasta filata cheese mass may be cooked until the pH of the curd is reduced to a range of about 5.5 to about 6.2. As the pH of the cheese curds drop further with time, it will put them into the target pH range for the heating, kneading, and stretching of the cheese curds into a pasta filata cheese mass.

In some embodiments, the cooked cheese curd may be delivered immediately to equipment that heats, kneads, and stretches the cheese curd into a pasta filata cheese mass. In other embodiments, the cooked cheese curd may be stored for a period of time before being delivered to the that equipment. The storage period may range from about 1 hour to about 72 hours (e.g., about 12 hours to about 30 hours). The cooked cheese curd may be held at one temperature during the storage period or two or more temperatures (e.g., two different temperatures). Exemplary temperature ranges for the cooked cheese curd during the storage period include about 50° F. to about 80° F. (e.g., about 60° F. to about 70° F.).

The storage period and storage temperature is set by the target degree of ripening for the cooked cheese curd when it is supplied to the equipment that heats, kneads, and stretches the cheese curd. Ripening in this context refers to the pH level (a.k.a., acidity level) of the cheese curd, with a lower pH translating to a more ripe cheese curd and a higher pH translating into a more green cheese curd. In many embodiments, the pH of the cooked cheese curd falls from a pH of around 6 (e.g., 6.2) during curd formation to a pH of less than about 6 (e.g., about 5.6 to about 5.9) upon completion of cooking. The cooked cheese curd continues to ripen following cooking, and should generally be in a pH ranging from about 5.2 to about 5.4 when being heated, kneaded, and stretched into a pasta filata cheese mass.

ii. Pipeline Processes for Forming Cheese Curd Particles

Additional embodiments for forming cheese curd also include methods that form curd particles in pipeline or other conduit that maintains a turbulent flow to keep the coagulating casein proteins from forming a single curd coagulum. These methods include preparing the milk or other source of dairy proteins for the coagulation of casein proteins by acidifying the milk and adding a coagulating enzyme to the milk. For example, an acid or starter culture may be added to the milk to lower its starting pH to a pH ranging from about 6.0 to about 6.5. A coagulating enzyme may also be added to the milk to start enzymatically hydrolyzing the κ-casein proteins on the casein micelles. Similar to the above-described vat processes, the starter culture can continue lowering the pH of the curd particles during and after they are formed. The final pH target pH for the curd particles is set by the type of final cheese. For example, if the curd particles are used to make pasta filata cheese, the desired pH of the cheese curd particles when they are read to be heated, kneaded, and stretched into a pasta filata cheese mass normally ranges from about 5.1 to about 5.5 (e.g., 5.2 to 5.4). A more encompassing exemplary pH range for the acidification of the milk and curd particles is about 4 to about 6, depending on the type of cheese mass that is formed from the cheese curd particles.

While the lowering of the milk's pH and addition of the coagulating enzymes is priming the casein micelles for coagulation into curd, the temperature of the milk is held in a range that slows or prevents immediate curd formation. The temperature of the milk is less than 71.5° F., which is normally the low threshold temperature for the enzymatically modified casein micelles to coagulate into curd under mildly acidic conditions. Other exemplary temperature ranges for the milk to suppress immediate curd formation include about 40° F. to about 70° F., about 45° F. to about 55° F., and about 50° F. to about 65° F. The enzymatic hydrolysis of the κ-casein proteins at these lower temperatures that suppress curd formation is referred to as a "cold incubation" period. It typically lasts for about 30 seconds to about 20 hours (e.g., 6 hours to 20 hours).

The cold incubation period is followed by heating the milk to a temperature above the low temperature threshold (i.e., about 71.5° F.) under turbulent flow conditions to start the formation of cheese curd particles. The turbulent flow prevents the modified casein micelles from forming a single curd coagulum, and instead form disaggregated cheese curd particles. Embodiments include raising the temperature of the milk from the cold incubation temperatures to a coagulation temperature range of about 75° F. to about 130° F. (e.g., 85° F. to 130° F.). Because most or all of the casein micelles were modified by the coagulating enzymes during the cold incubation period, the coagulation period is rapid, and is normally completed in less than 1 minute (e.g., 10 second to 50 seconds).

The rapid coagulation of the curd particles transforms the milk into a mixture of curd particles and a surrounding liquid that includes whey proteins, water, and water soluble milk components such as carbohydrates and minerals, among others. Embodiments include separating the curd particles from the surrounding liquid by filtration and/or centrifugation. For example, the mixture of curd particles and surrounding liquid may be transferred from the turbulent pipeline where the curd particles were formed to a sieve, decanter, and/or conveyor belt having a porous surface though which the surrounding liquid passes to leave behind the curd particles.

In some embodiments, the separated curd particles may be washed to remove residual whey and/or adjust the mineral content of the curd particles. The wash liquid used to wash the separated curd particles may be an acidic aqueous solution that has pH ranging from about 3 to about 5.5, and may have a temperature higher than room temperature (e.g., a temperature ranging from 85° F. to 190° F.). As noted above for the vat processes, the particles of cheese curd should have a pH of about 5.2 to about 5.4 when being heated, kneaded, and stretched into a pasta filata cheese mass.

In some embodiments the separated and optionally washed cheese curd particles may be cooled and stored for use in a process for forming the cheese curd particles into a cheese mass. In additional embodiments, the separated and optionally washed cheese curd particles are fed directly to the equipment that forms the particles into a cheese mass in what is referred to as a continuous process. These continuous processes provide an uninterrupted supply of the cheese mass to the cheese shaping equipment for as long as milk or other dairy protein source is provided to the systems for forming the dairy proteins into a cheese curd, and forming the cheese curd into the cheese mass.

Some embodiments for forming cheese curd particles replace the cold incubation step with a fast incubation period that keeps the milk at curd coagulation temperatures during acidification and the introduction of the coagulating enzymes. In these embodiments, the temperature of the milk is maintained above 71.5° F., and the enzymatically modified micellar casein proteins start to coagulate under turbulent flow conditions almost immediately. The formation of the curd particles is generally completed in about 30 seconds to about 15 minutes, after which the curd particles are separated from the surrounding liquid and optionally washed as described above. Additional details about both the cold incubation and fast incubation pipeline processes for forming cheese curd particles can be found in co-assigned U.S. Pat. No. 8,603,554 issued Dec. 10, 2013, and titled "CHEESE AND METHODS OF MAKING SUCH CHEESE" the entire contents of which are hereby incorporated by reference for all purposes.

C. Forming the Cheese Curd into the Cheese Mass

The cheese curds formed from milk or some other source of dairy proteins are used in processes to form a cheese mass that is supplied to the system for converting that cheese mass into cheese shapes. The processes for forming the cheese curds into a cheese mass are set by the type of cheese that is ultimately made. In the present application, the types of cheeses are broadly classified as (i) natural cheeses and (ii) processed cheeses. Natural cheeses are cheeses made directly from milk, and include unripened cheeses (e.g., cottage cheese, cream cheese), soft cheeses (e.g., Brie, Camembert, Coulomminer), semi-hard cheeses (Brick, Muenster, Roquefort, Stilton, Colby, Gouda, Monterey Jack), hard cheeses (Swiss, Parmesan, Romano), blue veined cheeses (e.g., Blue, Gorgonzola), and pasta filata cheeses (e.g., Mozzarella, Provolone, Scamorza, Caciocavallo). Processed cheeses are made using one or more type of natural cheese plus additional ingredients, such as emulsifiers and vegetable oils, that are combined and cooked together to form the processed cheese. Examples of processed cheeses include American cheese, and Provel cheese.

In addition to natural cheeses and processed cheeses, there is a third type of cheese product called an analogue cheese (a.k.a. imitation cheese) that may be used as the cheese mass. Analogue cheeses have at least a portion of the milk proteins and/or milk fats replaced with vegetable proteins and/or vegetable oils. Exemplary replacement vegetable proteins include peanut proteins and soybean proteins, among other exemplary vegetable proteins. Exemplary replacement vegetable oils include palm oil, cottonseed oil, soybean oil, and corn oil, among other exemplary vegetable oils. In some embodiments the analogue cheese as made from ingredients and processes similar to natural cheese, only with some of the milkfat replaced with a vegetable oil. In other embodiments, the analogue cheese is made from ingredients and processes similar to processed cheese, only with vegetable oils and/or proteins being included with the other processed cheese ingredients that are blended with the natural cheese. In still other embodiments, the analogue cheese is formed from a blend to ingredients that lack any cheese curd. Examples include a blend water, casein protein and/or rennet casein, starch, emulsifying salts, and sodium chloride that is cooked, combined with vegetable oil, and further heated and sheared to form the analogue cheese mass.

The discussion below provides examples of processes for converting cheese curds into cheese masses for pasta filata cheeses. However, it should be appreciated that cheese masses of other types of natural cheeses, as well as blends of two or more types of natural cheeses, can also be supplied as a cheese mass to the present systems and processes of forming cheese shapes. There is also provided examples of processes for forming cheese masses of processed cheese. Because processed cheeses use one or more types of natural cheese as an ingredient, many of the above-described embodiments for providing a source of dairy proteins and forming them into a cheese curd are also applicable to processes of making a cheese mass of processed cheese. However, it should be appreciated that the below described processes for converting cheese curds into cheese masses for pasta filata cheeses many not be applicable except when the natural cheese used in the processed cheese happens to be a pasta filata cheese.

i. Forming Cheese Curd into a Pasta Filata Cheese Mass

Embodiments for forming cheese curd into a pasta filata cheese mass include supplying the cheese curds to a cooker/stretcher, also called a mixer/stretcher, that heats, kneads and stretches the curd into a pasta filata cheese mass. Embodiments include supplying the cheese curd to an inlet of the cooker/stretcher where the curd is heated by contact with hot water. Exemplary temperatures for the water range from 130° F. to 190° F. (e.g., 135° F. to 150° F.), which heat the cheese curd and the forming pasta filata cheese mass to temperatures ranging from 120° F. to 150° F. (e.g., 130° F. to 150° F.). In additional embodiments, the water used to heat the cheese curds and forming cheese mass is at least partially replaced with steam that is injected at one or more points into the cooker/stretcher. The cheese curds and forming cheese mass may also be heated without direct contacting with additional water by heating the walls of the cooker/stretcher as well as the equipment in the cooker/stretcher that mechanically works the curds and cheese mass.

The heating of the cheese curd is accompanied by mechanically working (i.e., kneading and stretching) the curd to transform them from discrete pieces or particles into a plastic and workable heated cheese mass. The mechanical working of the curd may be accomplished by one or more augers that knead and stretch the cheese curd into the cheese mass while also transporting the cheese mass out to an outlet of the cooker/stretcher. The rotational speed of the auger may be set achieve specific functional properties, such as stretch and elasticity, to the cheese mass and shaped cheese, as well as a residence time for the cheese curds and cheese mass in the cooker/stretcher. Exemplary rotational speeds range from about 5 rpm to about 40 rpm (e.g., 10 rpm to 20 rpm). In some embodiments, two or more augers are used to mechanically work the cheese curd and forming pasta filata cheese mass, while in other embodiments a single auger is used to mechanically work the cheese curd and cheese mass. An example of a single auger cooker/stretcher assembly is shown and described in co-assigned U.S. Pat. No. 3,713,220 issued Jan. 30, 1973, and titled "APPARATUS FOR MIXING CHEESE CURD" the entire contents of which are hereby incorporated by reference for all purposes.

In some embodiments, one or more ingredients are added to the cheese curd and the forming pasta filata cheese mass in the cooker/mixer. In additional embodiments, one or more ingredients are added to the cheese mass in the interval between the cheese mass exiting the cooker/mixer and being ready for the process of forming the cheese mass into a cheese shape. In some embodiments the one or more ingredients are added to the cheese mass during this interval they may be passively absorbed into the cheese mass. In additional embodiments, the one or more ingredients are actively mixed with the cheese mass using mixing equipment. Examples of the ingredients added to the cheese curd and/or pasta filata cheese mass include non-fat dry milk, whey protein (e.g., WPC or WPI), casein protein, an acidity regulator, an acid, an anticaking agent, an antifoaming agent, a coloring agent, an emulsifier (e.g., citric acid, lactobionic acid, ethylenediaminetetraacetic acid, phosphoric acid, and the emulsifying salts described below), an enzyme preparation, a flavoring agent, a firming agent, a food protein, a gelling agent, a preservative, a sequestrant, a stabilizer, a starch, a thickener, a vegetable oil, an animal oil or fat, a cheese, a cheese powder, a salt, a spice, a nutritional supplement, an enzyme, a neutraceutical, a carbohydrate, a vitamin, and a mineral, among other ingredients.

In further embodiments, the cheese mass may be mixed with other foods such as vegetables, fruits, meats, condiments, and grains among other foods. Exemplary vegetables include pepper (e.g., jalapeno pepper), tomatoes, onions (e.g., white onion, red onion, yellow onion, green onion, etc.), beans (e.g., black beans, red beans, bean curd, etc.), olives, potato (e.g., sweet potato, white potato, etc.), garlic, celery, corn, and carrots, among other vegetables. Exemplary fruits include apples, strawberries, blueberries, raspberries, cranberries, raisins, oranges, peaches, apricots, plums, among other fruits. Exemplary meats include beef, poultry, fish, shellfish, lamb, and pork, among other meats, as well as meat products such as sausage, jerky, and bacon, among other meat products. Exemplary condiments include ketchup, relish, mustard, salsa, picante, sauces, and marinades, among other condiments. Exemplary grains include wheat, rye, couscous, and rice, among other grains.

In some embodiments, the ingredients are added to the cheese curd and/or the pasta filata cheese mass as dry powders and/or aqueous solutions. For ingredients such as certain vegetable oils that are not dry powders at room temperature nor soluble in water to any appreciable extent, they may be added as single-phase liquids. Additional details about the methods and systems for adding these ingredients to cheese curd and/or the pasta filata cheese mass are described in co-assigned U.S. Pat. No. 5,902,625 issued May 11, 1999, and titled "PROCESS OF MAKING A SOFT OR SEMI-SOFT FIBROUS CHEESE" the entire contents of which are hereby incorporated by reference for all purposes.

In additional embodiments, the ingredients are added to the cheese curd and/or the pasta filata cheese mass as a slurry that includes two or more distinct but intermixed phases. For example the slurry may include particles of one or more ingredients that are mixed or suspended in a liquid phase of water or a liquid ingredient. In many embodiments, the slurry undergoes thermal and/or mechanical treatments to mix, homogenize, and/or activate one or more of the ingredients in the slurry before it is added to the cheese curd and/or the pasta filata cheese mass. In many instances, the thermal and/or mechanical treatments of the slurry ingredients are too extreme to be conducted after the ingredients have been added to the cheese curd and/or the pasta filata cheese mass. Additional details about the methods and systems for preparing and adding these slurries of ingredients to cheese curd and/or the pasta filata cheese mass are described in co-assigned U.S. Pat. No. 7,585,537, issued Sep. 8, 2009, and titled "CHEESE AND METHODS OF MAKING SUCH CHEESE"; U.S. Pat. No. 7,651,715, issued Jan. 26, 2010, and titled "BLENDED CHEESES AND METHODS FOR MAKING SUCH CHEESES"; and U.S. Pat. No. 7,579,033, issued Aug. 25, 2009, and titled "METHODS FOR MAKING SOFT OR FIRM/SEMI-HARD RIPENED AND UNRIPENED CHEESE AND CHEESES PREPARED BY SUCH METHODS." The entire contents of all three patents are hereby incorporated by reference for all purposes.

ii. Forming a Cheese Mass of Processed Cheese

A processed cheese mass is made by (i) comminuting and one or more natural cheeses, (ii) blending the comminuted natural cheese with other processed cheese ingredients to form a processed cheese blend, and (iii) heating the processed cheese blend to form the processed cheese mass. The selection of natural cheeses to comminute and blend is set by the type of processed cheese mass being produced. For example, American cheese is a typically a blend of Colby and Cheddar cheeses, and Provel cheese is typically a blend of Cheddar, Swiss, and provolone cheeses. Examples also include processed cheese that is made from a single type of natural cheese, such as Mozzarella cheese that is used to make processed pizza cheese. Natural cheese is normally the single largest ingredient by weight used in the processed cheese mass and may range from about 51 wt. % to about 95 wt. % of the total weight of the processed cheese mass.

The other processed cheese ingredients blended with the one or more natural cheeses include emulsifying salts, water, dairy proteins, sodium chloride, and starch among other ingredients. The emulsifying salts may be a combination of a monovalent cation paired with a polyvalent anion. Exemplary monovalent cations include alkali metal cations, such as sodium ($Na^+$) or potassium (K+) cations, as well as ammonium ($NH_4^+$) cations. Exemplary polyvalent anions include organic anions such as citrate, lactate, lactobionate, gluconate, and ethylenediaminetetraacetate anions, among others, and inorganic anions including phosphate anions such as monophosphates, diphosphates, triphosphates, pyrophosphates, and polyphosphates, among other inorganic anions. Specific examples of emulsifying salts include sodium citrate, sodium phosphate (including monosodium, disodium and trisodium phosphate), sodium tartrate, sodium aluminum phosphate, sodium diphosphate (including disodium, trisodium, and tetrasodium diphosphate), sodium tripolyphosphate (including tetrasodium tripolyphosphate), sodium hexametaphosphate, tripotassium citrate, potassium phosphate (including monopotassium, dipotassium, and tripotassium phosphate), potassium tartrate, potassium aluminum phosphate, potassium diphosphate (including dipotassium, tripotassium, and tetrapotassium diphosphate), potassium tripolyphosphate (including tetrapotassium tripolyphosphate), sodium and/or potassium pyrophosphate, sodium and/or potassium ethylenediaminetetraacetate, sodium and/or potassium lactate, sodium and/or potassium lactobionate, and sodium and/or potassium gluconate, and ammonium polyphosphate, among other emulsifying salts. The emulsifying salts normally range from about 0.5 wt. % to about 3 wt. % of the processed cheese mass. The use of sodium-containing emulsifying salts often give processed cheese masses a higher sodium content than natural cheese masses. Typical levels of sodium in processed cheese masses range from about 1.0 wt. % to about 1.5 wt. %, whereas natural cheese masses have exemplary sodium contents ranging that are less than 1.0 wt. % (e.g., about 0.8 wt. %).

The processed cheese blend formed from the one or more natural cheeses and other processed cheese ingredients are then heated to form the processed cheese mass. In many embodiments the heating of the processed cheese blend is accompanied by mechanically working the blend and/or cheese mass. For example, the heating may be accompanied by mechanically shearing to for a processed cheese mass smooth homogenous consistency and texture. In some embodiments, the processed cheese blend is heated at temperatures ranging from about 150° F. to about 200° F. for periods of time ranging from about 4 minutes to about 15 minutes. In additional embodiments, the processed cheese blend is heated at higher temperatures ranging from about 260° F. to about 295° F. for shorter periods of time ranging from about 1 second to about 10 seconds, followed by rapid cooling of the processed cheese mass to temperatures of about 195° F. or less.

The processed cheese mass normally has smaller and more uniformly distributed fat globules than a cheese mass of natural cheese. The fat globules in the processed cheese mass typically have and average particle diameter that ranges from about 1 μm to about 10 μm. They are also typically more spherical in shape than fat globules found in natural cheeses, particularly those found in pasta filata cheeses.

II. Methods of Making Cheese Shapes from a Cheese Mass

As shown in FIG. 1, embodiments may include a method 100 of making a cheese shape. Method 100 may include providing a cheese-shaping system (block 102). The cheese-shaping system may include at least a first chilled roller belt. Methods may include chilling the roller belt below room temperature by spraying a cooling liquid on the surface of the roller belts opposite the surface of the belt that contacts the cheese mass. The cheese-shaping system may include a second chilled roller belt aligned substantially parallel to the first chilled roller belt. A gap may be formed between the first and second chilled roller belts. This gap may define a thickness of the cheese sheet in contact with both the first and second chilled roller belts. A third chilled roller belt may also be used to cool the cheese mass further if necessary. In the case of a third chilled roller belt, the belt may be aligned parallel or in series to at least one of the first or second chilled roller belts. Additional details of the cheese-shaping system are described later, and the cheese-shaping system may be any cheese-shaping system described herein.

The cheese mass provided to the cheese-shaping system may be made by the processes described above. These processes of making the cheese mass include (i) providing a source of dairy proteins, (ii) forming the dairy proteins into a cheese curd, and (iii) forming the cheese curd into a cheese mass. Exemplary cheese masses provided to the cheese-shaping system include natural cheeses, processed cheeses, and combinations thereof.

Method 100 may also include supplying a cheese mass having a molten consistency to a cheese extruder which then presents the cheese to the first chilled roller belt (block 104). A cheese sheet may then be formed on the first chilled roller belt (block 106). The cheese mass may be moved through the gap between the first and second chilled roller belts to form the cheese sheet. The gap may define the thickness of the cheese sheet in contact with the first and second chilled roller belts. In some embodiments, a third chilled roller belt may be aligned substantially parallel or in series to the first and/or second chilled roller belts. Belts in series may be aligned side-by-side, while belts in parallel may have a portion of a belt stacked on top of another belt. The gap between the second and third chilled roller belts may define the thickness of the cheese sheet in contact with the respective belts. The cheese sheet may then be further cooled on the third chilled roller belt. The cheese sheet may include a plurality of cheese fibers. The cheese fibers may be uniformly aligned and may be in the direction in which the cheese was flowing during formation of the cheese sheet. Method 100 may further include cooling the cheese sheet through contact with the first chilled roller belt (block 108). Cooling the cheese may also include contact with another chilled roller belt.

In addition, method 100 may include forming and removing the cheese shape from the cooled cheese sheet (block 110). Forming and removing the cheese shape from the cheese sheet may include stamping or rolling a cutter with an outline of the cheese shape into the cheese sheet. The cutter may form the cheese shape independently of the cheese sheet. The cheese shape may be separated from the cheese sheet. The cheese shape may be a form of cheese similar to the final form before the cheese is cooked or consumed. The cheese shape may be circular or elliptical. The cheese shape may be a pizza cheese disc used on a pizza. The pizza cheese disc may have a diameter ranging from 6 inches to 24 inches, depending on the diameter of the pizza cheese crust. In some embodiments, a circular cheese shape may be considerably smaller than the diameter of the pizza crust, allowing for forming smaller discs that mimic slices of "mozzball" cheese in fancier types of pizza. The disc may have a thickness ranging from about 1/16-in to 3/4-in. The cheese shape may be triangular, rectangular, square, hexagonal, or octagonal.

In embodiments, forming the cheese shape may include rolling a circular cutter into the cheese sheet to form the cheese shape. The circular cutter may be similar to a pizza cutter, where the cutting edge is along a circle. The cheese shape formed may include two substantially straight lines that intersect at an angle. The angle may be a right angle, such as in a square or a rectangular cheese shape, or may be another angle, such as an octagon. Methods may include a plurality of circular cutters, which may include a circular cutter for each line of the cheese shape. In other embodiments, a single circular cutter may make multiple line cuts.

The cheese shape, including any shape described herein, may be a cheese slice used in a sandwich. Embodiments include forming the cheese slice from a cheese mass made of one or more natural cheeses. In contrast to conventional methods that first form a cheese block instead of a cheese sheet, and then cut the block into cheese slices, these embodiments separate or stamp the cheese sheet into individual cheese slices. The separation of the cheese shape from the cheese sheet may result in forming cheese scraps. Method 100 may include adding cheese scraps back to the cheese mass used to form the cheese shapes.

Method 100 may also include docking the cheese shape used for pizza or other baking applications to form holes in the cheese shape. The holes formed from docking are small in size and may be less than 1/32 inch in diameter. The holes may be too small to encompass or melt around toppings for pizza. The holes formed by docking may be uniformly distributed in the cheese shape. In some instances, equally spaced pairs or triplets of holes formed by docking may be uniformly distributed in the cheese shape even if all holes may not be uniformly distributed in the cheese shape. Holes formed by docking may each have the same diameter. Docking holes may be formed using the cutter that forms the cheese shape. The docking hole pattern may be present as protrusions in the cutter. Docking may allow for steam and other gases trapped in pizza sauce and crust below the cheese disc during baking to escape without causing bubbling, which may be followed by subsequent blistering. Docking may create a larger surface area for liquid application and hence improved melt. Docking may also help separation of discs by minimizing contact surface between the discs.

Method 100 may include freezing the cheese shape (block 112). Freezing the cheese shape may include exposing the cheese shape to chilled air. The chilled air may freeze the cheese shape in about 10 minutes or less. Freezing the cheese shape may maintain the moisture in the cheese before the cheese is frozen.

In some embodiments, method 100 may include applying a liquid application to the cheese sheet or the cheese shape (block 114). The liquid application may include an anti-sticking agent that permits adjacent pieces of the stacked cheese shapes to be pulled apart without tearing. In some embodiments, the liquid application may exclude an anti-sticking agent. For instance, if the cheese sheet or cheese shape has a softer texture, then an anti-sticking agent may be needed. The liquid application may include a functionality control agent that may affect the blister, melt, stretch, or appearance characteristics of the cheese. The liquid application may be a surfactant. Liquid applications may include water, surfactants, defoaming agents, dairy fats, and/or non-dairy fats. A functionality control agent may include a surfactant, defoaming agent, dairy fat, non-dairy fat, chelating agent, and/or flavor. The liquid application may include vegetable oil, soy lecithin, flavor, beta-carotene, or a combination thereof. In some embodiments, the liquid application may include at least one of a release agent, a sequestrant, or a flavor. The liquid application may be added to one or both sides of the cheese shape at a rate of about 2.5 to 4% weight % of the cheese or less.

Surfactants may include octanoic acid, petroleum jelly, polydimethylsiloxane, dimethyl silicone, lecithin, phosphated mono and di-glycerides, potassium caseinate, dimethylpolysiloxane, polyvinylpolypyrrolidone, potassium tartrate, colloidal silica, silicasol, ionic surfactants, anionic surfactants, or mixtures thereof. Dairy fats may include sweet cream, whey cream, butter, plastic cream, anhydrous butter oil, or anhydrous milk fat (AMF). Non-dairy fats may include soybean oil, canola oil, sunflower oil, olive oil, palm oil, coconut oil, corn oil, safflower oil, Vegalene®, other vegetable oil, or mixtures thereof. Vegalene® may include partially hydrogenated soybean oil, canola oil, and sunflower oil.

Method 100 may also include packaging the cheese shape (block 116). Packaging the cheese shape may include stacking cheese shapes and wrapping the cheese shapes in a paper or plastic sheet to protect the cheese from contaminants and ambient moisture.

Figure 2:
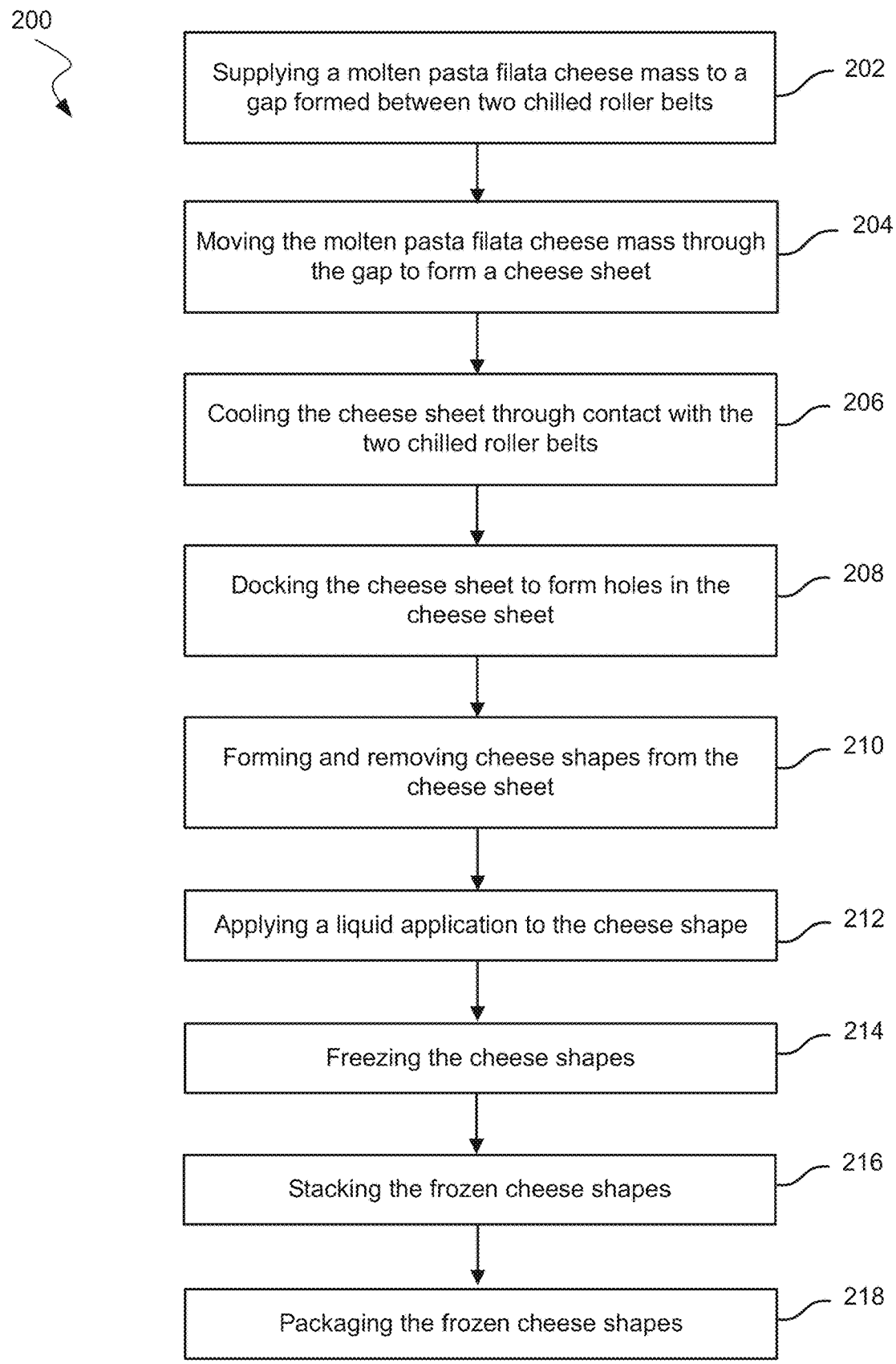
FIG. 2 is a flowchart showing selected steps in a method of making cheese shapes according to embodiments of the present technology.

Some embodiments, as shown in FIG. 2, may include a method 200 of making cheese shapes. Method 200 may include supplying a pasta filata cheese mass in molten form to a gap formed between two chilled roller belts (block 202). The two chilled roller belts may be aligned substantially parallel to each other. Substantially parallel may include belts that measure parallel by tools typically used by a person skilled in the process of cheese making. The two chilled roller belts may be part of any cheese-making system described herein.

Method 200 may also include moving the pasta filata cheese mass through the gap to form a cheese sheet (block 204). The cheese sheet may include a plurality of substantially aligned cheese fibers. Method 200 may further include cooling the cheese sheet through contact with the two chilled roller belts (block 206).

Method 200 may additionally include docking the cheese shapes to form holes in the cheese shapes (block 208). Docking may include any methods described herein.

Cheese shapes may be formed and removed from the cheese sheet (block 210). The cheese shapes may be any cheese shape described herein and may include any cheese described herein. Forming and removing the cheese shape from the cheese sheet may include stamping or rolling a cutter with an outline of the cheese shape into the cheese sheet. The cutter may form the cheese shape independently of the cheese sheet. For example, the cheese sheet may be substantially rectangular, but a non-rectangular shape, such as a circle, may be formed with the cutter. The cheese shape may be separated from the cheese sheet.

In some embodiments, method 200 may include applying a liquid application to the cheese shapes (block 212). The liquid application may include at least one of an anti-sticking agent and a functionality control agent. The liquid application may include any liquid application described herein.

Method 200 may also include freezing the cheese shapes to form frozen cheese shapes (block 214). Freezing the cheese shapes may be by exposing the cheese shapes to chilled air for 10 minutes or less. Freezing may include any methods described herein. In embodiments, a liquid application may be applied to the frozen cheese shapes.

Furthermore, method 200 may include stacking the frozen cheese shapes, where the stacked cheese shapes do not tear when pulled apart (block 216). Stacking the frozen cheese shapes may exclude a membrane, paper, or other material inserted between adjacent cheese shapes. In other words, stacking one frozen cheese shape may be stacked directly upon another frozen cheese shape.

Method 200 may also include packaging the frozen cheese shapes (block 218). The frozen cheese shapes may be packaged as a stack.

Figure 3:
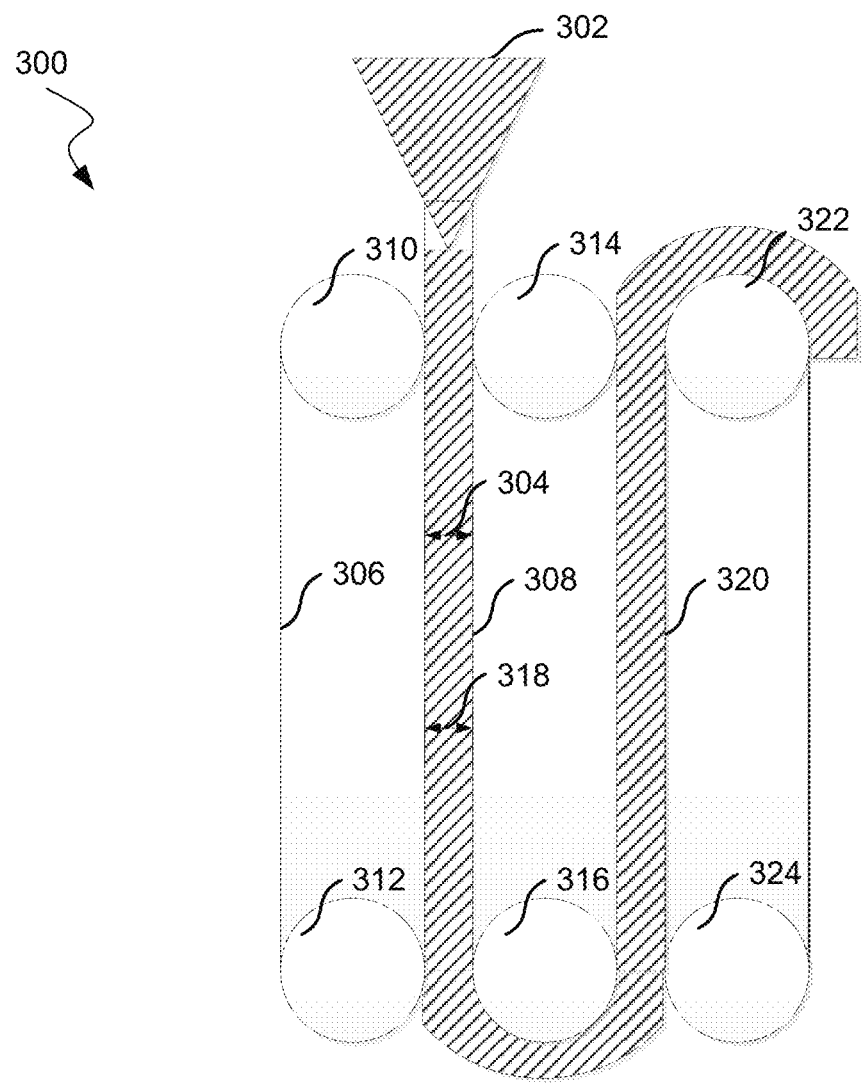
FIG. 3 is a diagram of a system used to make a cheese shape according to embodiments of the present technology.

As shown in FIG. 3, embodiments may include a system 300 to make a cheese shape. A cheese mass supply subsystem, which may include an extruder, supplies a cheese mass in molten form 302. Mass of cheese mass 302 may then travel through a gap 304 between a pair of roller belts 306 and 308 in system 300. Roller belt 306 may contact rollers 310 and 312 and roller belt 308 may contact rollers 314 and 316. Gap 304 may be in a range from about ⅟32 in to ¾ in. The thickness of the cheese sheet 318 formed may be the same as or similar to gap 304. For example, the thickness of the cheese sheet may be within ⅛ in of the width of the gap.

Roller belts 306 and 308 may be aligned substantially parallel to each other. The pair of roller belts may be positioned in a substantially vertical direction relative to ground, as shown in FIG. 3. In other embodiments, the pair of roller belts may be positioned in a substantially horizontal direction relative to ground or at an angle from 0 degrees to 90 degrees from horizontal. Positioning the pair of roller belts substantially vertically may reduce the footprint of a cheese processing facility, may increase uniformity, and may increase efficiency.

System 300 may further include roller belt 320. Roller belt 320 may contact rollers 322 and 324. Roller belt 320 may be substantially parallel to at least one of roller belt 306 or roller belt 308.

System 300 may also include a belt chilling subsystem that chills the roller belts and/or rollers below room temperature. The belt chilling subsystem may include a plurality of spray nozzles that spray a cooling liquid on a surface of the roller belts that is opposite a surface that contacts the cheese mass. The cooling liquid may include water, glycol or brine solutions. The brine may include salt or sugar. The cooling liquid may include substances that depress freezing point, such as salt, sugar, glycol, glycerol, and alcohols.

System 300 may further include a cheese shape forming subsystem that forms the cheese shapes into a cheese sheet. The cheese sheet may be formed and chilled from a cheese mass pulled through the gap between the pair of roller belts. The cheese shape forming subsystem may also dock the cheese shape by forming a plurality of holes in the cheese shape. The cheese shape forming subsystem may include a shape cutter that stamp cuts the cheese shape into the cheese sheet. The shape cutter may include a circular or elliptical shape or any shape described herein. The system may further include a docking subsystem that forms a plurality of holes in the cheese shape. If the final desired shape contains angles instead of curves, including right angles, then a series of circular cutting knives and/or cutting wires can be used to cut the shape from the cheese sheet. System 300 may include a recycling subsystem to collect scraps of cheese formed during docking or shape forming and mixing the scraps back into the cheese mass supplied by subsystem 302.

System 300 may also include a liquid application subsystem that applies a liquid application to the cheese shape. System 300 may include components of systems described in U.S. Pat. No. 9,185,876, entitled "METHOD AND DEVICE FOR HOMOGENISING A FIBROUS, VISCOUS FOOD MASS," the contents of which are incorporated by reference for all purposes.

In some embodiments, the system may include a freezing subsystem that includes a chilled air blower. The chilled air blower may expose the cheese shape to chilled air, which may freeze the cheese shape in 10 minutes or less.

Figure 4:
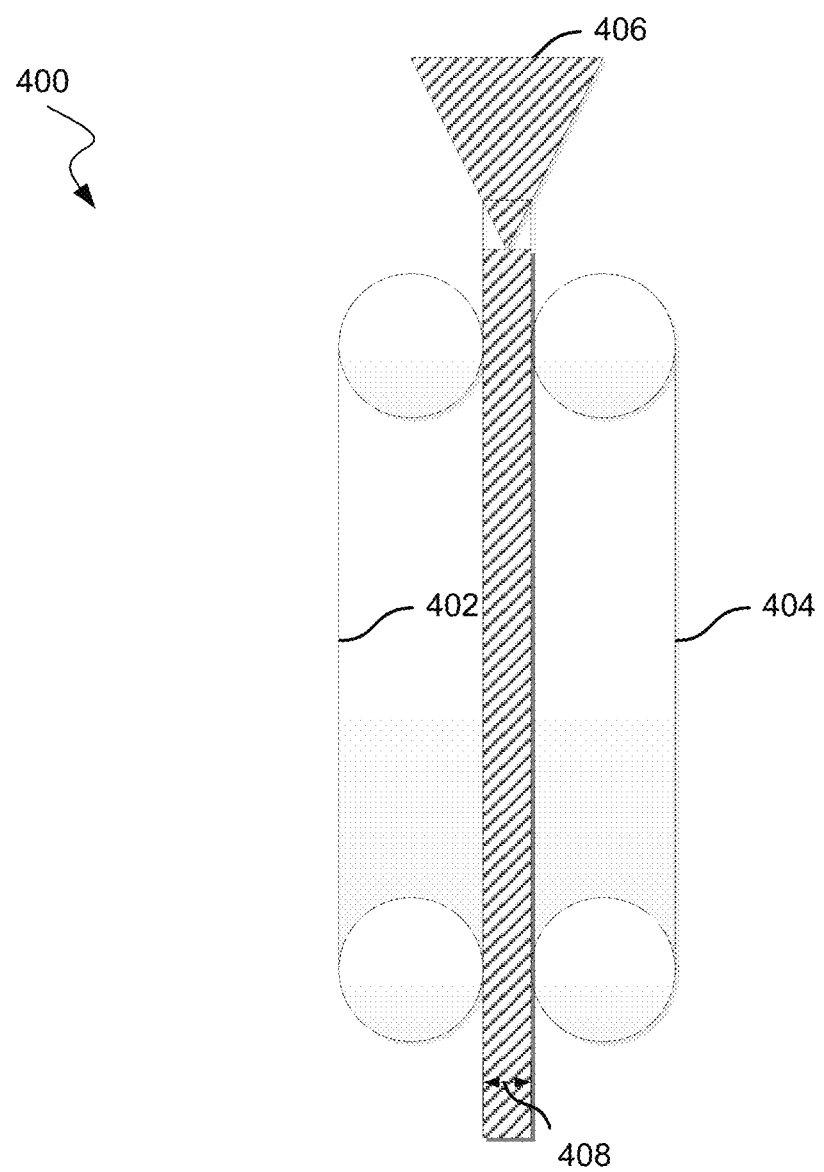
FIG. 4 is a diagram of a system used to make a cheese shape according to embodiments of the present technology.
Figure 5:
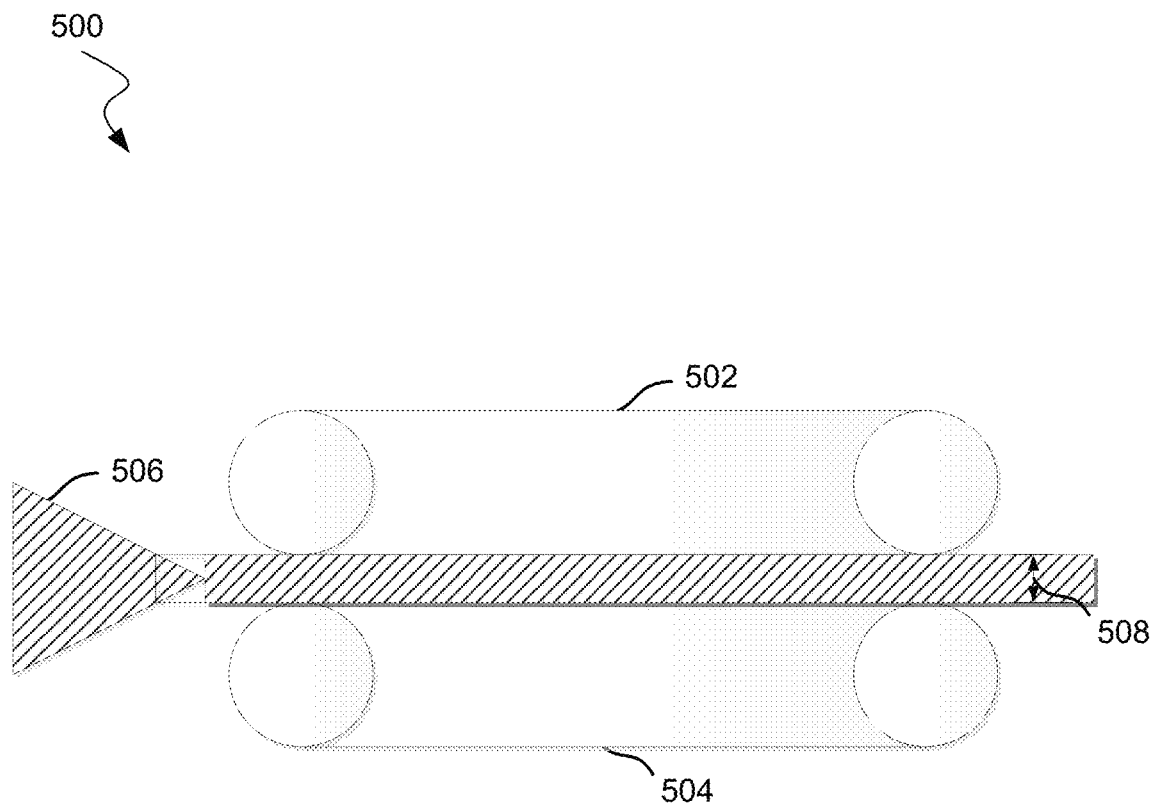
FIG. 5 is a diagram of a system used to make a cheese shape according to embodiments of the present technology.
Figure 6:
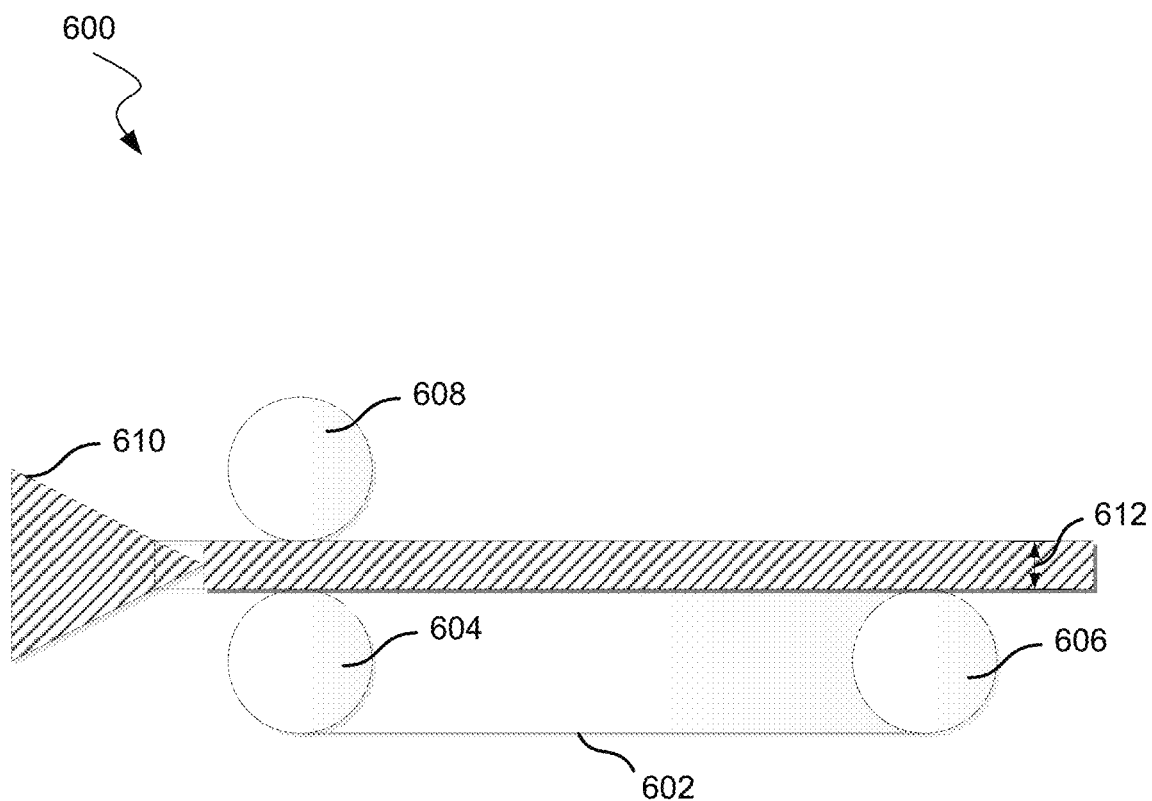
FIG. 6 is a diagram of a system used to make a cheese shape according to embodiments of the present technology.

Additional embodiments are shown in FIG. 4, FIG. 5, and FIG. 6. FIG. 4 shows a system 400 with roller belts 402 and 404 positioned substantially vertically. The cheese mass 406 passes through roller belts 402 and 404 to form a cheese sheet having thickness 408. Unlike system 300 in FIG. 3, only two roller belts are included. FIG. 5 shows system 500 with roller belts 502 and 504 positioned substantially horizontally, with roller belts moving the cheese mass 506 through to form a cheese sheet having thickness 508. FIG. 6 shows system 600, which includes a single roller belt 602 contacting rollers 604 and 606. Roller belt 602 is oriented substantially horizontally. Opposite roller belt 602 is roller 608, which does not contact a roller belt. Roller belt 602 and roller 608 move the cheese mass 610 to form a cheese sheet with thickness 612.

Figure 7A:
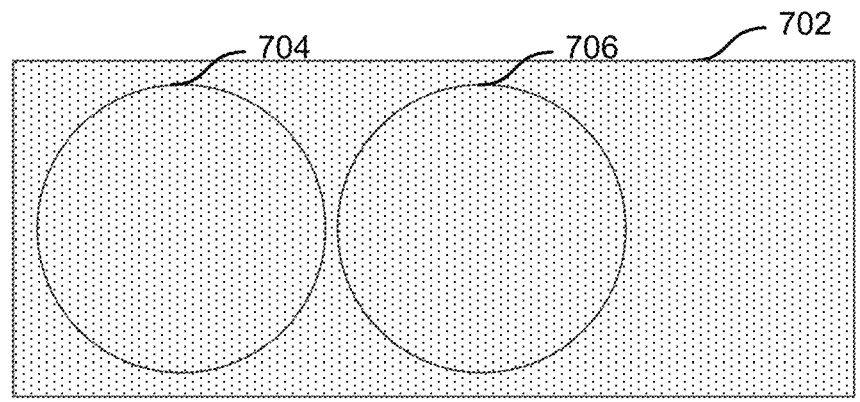
FIGS. 7A and 7B are diagrams of cheese sheets according to embodiments of the present technology.

FIG. 7A shows a cheese sheet 702, which may be formed by methods described herein on systems described herein. The cheese sheet may be docked with holes throughout the sheet. Discs 704 and 706 may be punched out of the cheese sheet. Discs 704 and 706 are shown as circular but may be any shape described herein.

Figure 7B:
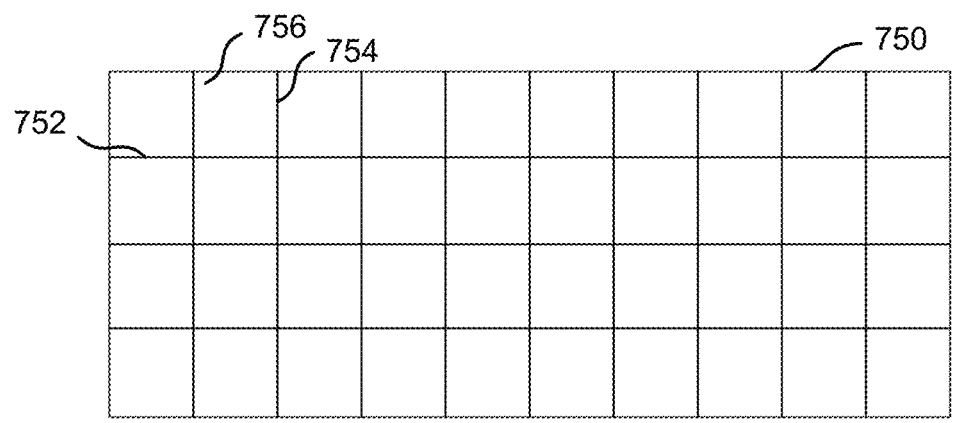

FIG. 7B shows a cheese sheet 750, which may be formed by methods described herein on systems described herein. The cheese sheet may include a series of cuts, such as cut 752. Cut 752 may be perpendicular to another series of cuts, including cut 754. The series of cuts may produce a cheese shape such as shape 756. Shape 756 may be a cheese slice for a sandwich.

Some embodiments may include a cheese disc and other cheese products. The cheese product may be shaped in the dimensions of a pizza. For example, the cheese product may be shaped to fit on pizza doughs, which may be used to produce different pizzas for consumption. The pizza dough may be a circle with a diameter ranging from 6 inches to 18 inches. The cheese product may be slightly smaller than the diameter of the pizza dough in order to form a crust without cheese on top. In some embodiments, the cheese product may be at least 1 inch less, 1 inch to 2 inches less, or 3 inches to 4 inches less in diameter than the diameter of the pizza dough. In some embodiments, the cheese product may have a square, rectangle, semi-circle, or an octagon shape. As with a circular cheese product, cheese products of other shapes may be sized such that the pizza dough extends beyond the cheese product by ½ inch, 1 inch, 1.5 inches, or 2 inches.

The cheese product may be made from a natural cheese and/or a processed cheese. For example, the cheese product may be made from a pasta filata cheese. The pasta filata cheese may include cheese fibers that are uniformly aligned, as described above. Furthermore, the pasta filata cheese may define a plurality of apertures. The apertures may be any of the holes formed by docking.

The cheese product may also include a liquid application applied to the cheese product (e.g., a pasta filata cheese). The liquid application may include a functionality control agent, water, a surfactant, a defoaming agent, a dairy fat (e.g., cream, plastic cream, anhydrous butter fat, butter cream powder), a sequestrant, a flavor, or a non-dairy fat. The liquid application may be any liquid application previously described herein.

Embodiments may include a method of maintaining cheese portion control and eliminating cheese waste from making a pizza pie. The method may include providing a cheese in the form of a cheese disc having a generally uniform thickness and size. Generally uniform may be interpreted as being uniform within tolerances acceptable to cheese making. In some embodiments, uniformity may be within 5%, 10%, or 15% of a mean, median, or desired value. The cheese disc thickness and size may be predetermined based on the desired pizza pie size. The cheese may be mozzarella cheese, provolone cheese, cheddar cheese, pizza cheese, Monterey jack cheese, analogue cheese, or a combination thereof.

The method may also include placing the cheese disc on the pizza dough to make the pizza pie. The pizza dough may be round or four-sided. The cheese disc may be dimensioned so as to be located within an inside boundary of a formed perimeter crust of the pizza dough when the cheese disc is placed on the pizza dough. The cheese disc may be dimensioned such that the cheese disc is framed by a border having a width of 0.5 inch or less, 0.5 inch to 1 inch, 1.5 inch to 2 inches, 2 inches to 2.5 inches, or 3 to 3.5 inches. The size of the cheese disc relative to the pizza dough may be any size described elsewhere herein.

A liquid application may be disposed on the cheese disc. The liquid application may be any liquid application described herein. The cheese disc may define a plurality of apertures, which may be any apertures or holes described herein.

Embodiments may include an uncooked pizza pie. The uncooked pizza pie may include a pizza dough and a cheese in the form of a cheese disc having a generally uniform thickness and size. The cheese may be any cheese described herein. The pizza dough and the cheese disc may be any shape described herein. The uncooked pizza pie may also include a liquid application applied to the cheese disc. The liquid application may be any liquid application described herein. The cheese disc may be disposed on the pizza dough. The cheese disc may define a plurality of apertures, which may be any apertures described herein.

EXAMPLE 1

A low-moisture, part-skim mozzarella cheese mass was prepared by forming a cheese curd followed by heating kneading and stretching in the presence of heated water (140 to 180° F.) to achieve a heated (125 to 160° F.) cheese mass. The heated cheese mass then was transferred to a mixer in which ingredients (slurry and dry powder) were mixed into the heated cheese mass.

The final heated cheese mass was then formed into cheese shapes by forming a cheese sheet having a thickness of between 1/16 in to 1/2 in and cooled to between 30 and 50° F. as described in Examples 2-4.

EXAMPLE 2

The cheese mass described in Example 1 was sheeted to 1/8 in in thickness and cooled to about 45° F. From the cooled cheese sheet, discs were cut that measured 12 inches in diameter.

Figure 8:
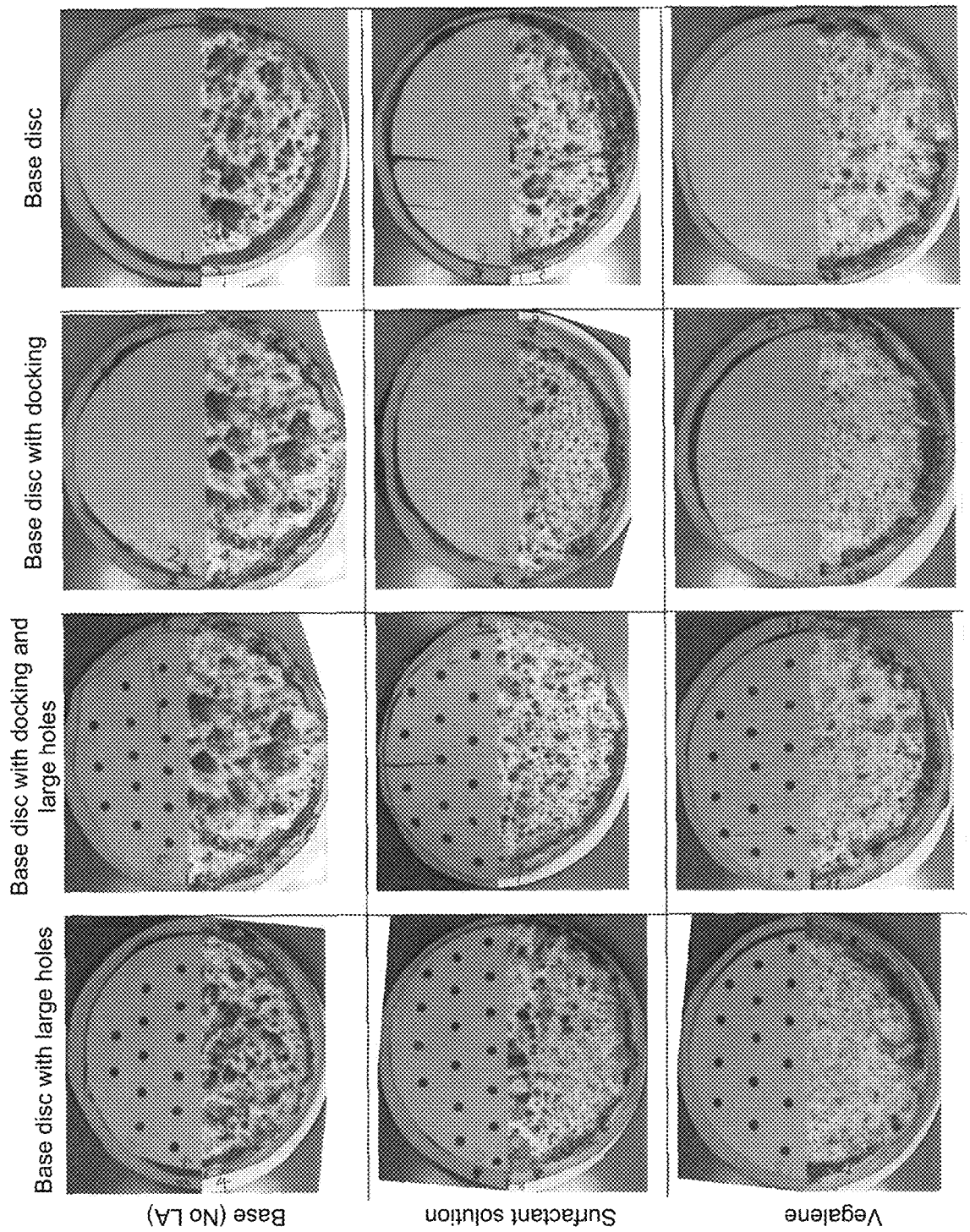
FIG. 8 shows images of pizza cheese discs with different liquid applications and different hole patterns before and after baking according to embodiments of the present technology.

The effect of holes, docking, and liquid application was tested for meltability, oil-off, blister size, and blister coverage on pizzas. The cheese disc was either docked with small holes, patterned with large holes with a diameter of 0.25 in, both docked and patterned, or not docked or patterned at all (base disc). These discs were either not treated with any liquid application, treated with a surfactant, or treated with Vegalene®. The surfactant solution is applied at 2.5% rate to the cheese by weight. The active surfactant in the applied solution was 10 to 400 ppm, and the active surfactant in the final cheese was 0.25 to 10 ppm. A non-dairy fat such as Vegalene® is a food spray and applied at 1.5% rate by weight. It contains vegetable oil, soy lecithin, flavor, beta-carotene, and propellant. A frozen disc of cheese was prepared and then thawed under refrigerated condition for two days. The pizza was prepared by having the pizza dough sheeted, the sauce applied, and then the cheese disc applied onto the pizza. The pizza was cooked at 460 F for 6.5 minutes in a conveyor oven. The pizzas were observed for melt quality and blister formation. The results are shown in Table 1 and in FIG. 8.

TABLE 1

Results of different perforation and liquid application treatments on pizza cheese discs.

| Pizza # | Docked | Holes (0.25 in) | Liquid application | Melt-ability | Oil-off | Blister size | Blister % coverage |
|---|---|---|---|---|---|---|---|
| 1 | None | None | None | Acceptable | Low | Mostly large | High—80% |
| 2 | Yes | None | None | Acceptable | Low | Mostly large | High—75% |
| 3 | Yes | Yes | None | Acceptable | Low | Mostly large | High—75% |
| 4 | None | Yes | None | Acceptable | Low | Mostly large | High—80% |
| 5 | None | None | 2.5% (0.2% surfactant solution) | Acceptable | Medium | Small and Medium | Medium—40% |
| 6 | Yes | None | 2.5% (0.2% surfactant solution) | Acceptable | Medium-High | Small and Medium | Medium—30% |
| 7 | Yes | Yes | 2.5% (0.2% | Acceptable | Medium | Small and | Medium—40% |

TABLE 1-continued

Results of different perforation and liquid application treatments on pizza cheese discs.

| Pizza # | Docked | Holes (0.25 in) | Liquid application | Melt-ability | Oil-off | Blister size | Blister % coverage |
|---|---|---|---|---|---|---|---|
| 8 | None | Yes | surfactant solution) 2.5% (0.2% surfactant solution) | Acceptable | Medium-High | Medium Small and Medium | Medium—30% |
| 9 | None | None | 1.5% Non-Dairy Fat (Vegalene) | Acceptable | High | Very small | Low—<10% |
| 10 | Yes | None | 1.5% Non-Dairy Fat (Vegalene) | Acceptable | High | Very small | Low—<10% |
| 11 | Yes | Yes | 1.5% Non-Dairy Fat (Vegalene) | Acceptable | High | Very small | Low—<10% |
| 12 | None | Yes | 1.5% Non-Dairy Fat (Vegalene) | Acceptable | High | Very small | Low—<10% |

The base disc with no docking, no holes, and no liquid application formed the highest blister percentage and had a mostly large blister size. Docking and putting 0.25 inches holes in the disc did not have a significant impact on pizza blister formation. Docking alone or not docking at all was observed to fail to produce a cheese of acceptable performance. However, applying a liquid application significantly impacted the final pizza appearance resulting in cheese that performs acceptably when baked on pizza. The liquid application decreased the blister percentage and the size of the blisters. Vegalene® increased oil-off significantly, with little blistering. Based on these results, surfactant liquid application was preferred for the best combination of blister appearance, melt performance, and oil-off. These experiments demonstrate that pizza quality can be impacted by type and level of liquid application. Docking in combination with liquid application showed lower blister percentage and size. In comparison to the base disc (without docking) or the base disc with docking, docking with a liquid application was observed to be the only means to produce an acceptable cheese disc.

EXAMPLE 3

The cheese mass from Example 1 was sheeted to ⅛ in and cooled to about 45° F. From the cooled cheese sheet, discs were cut from the cheese that measured 12 in diameter.

Figure 9:
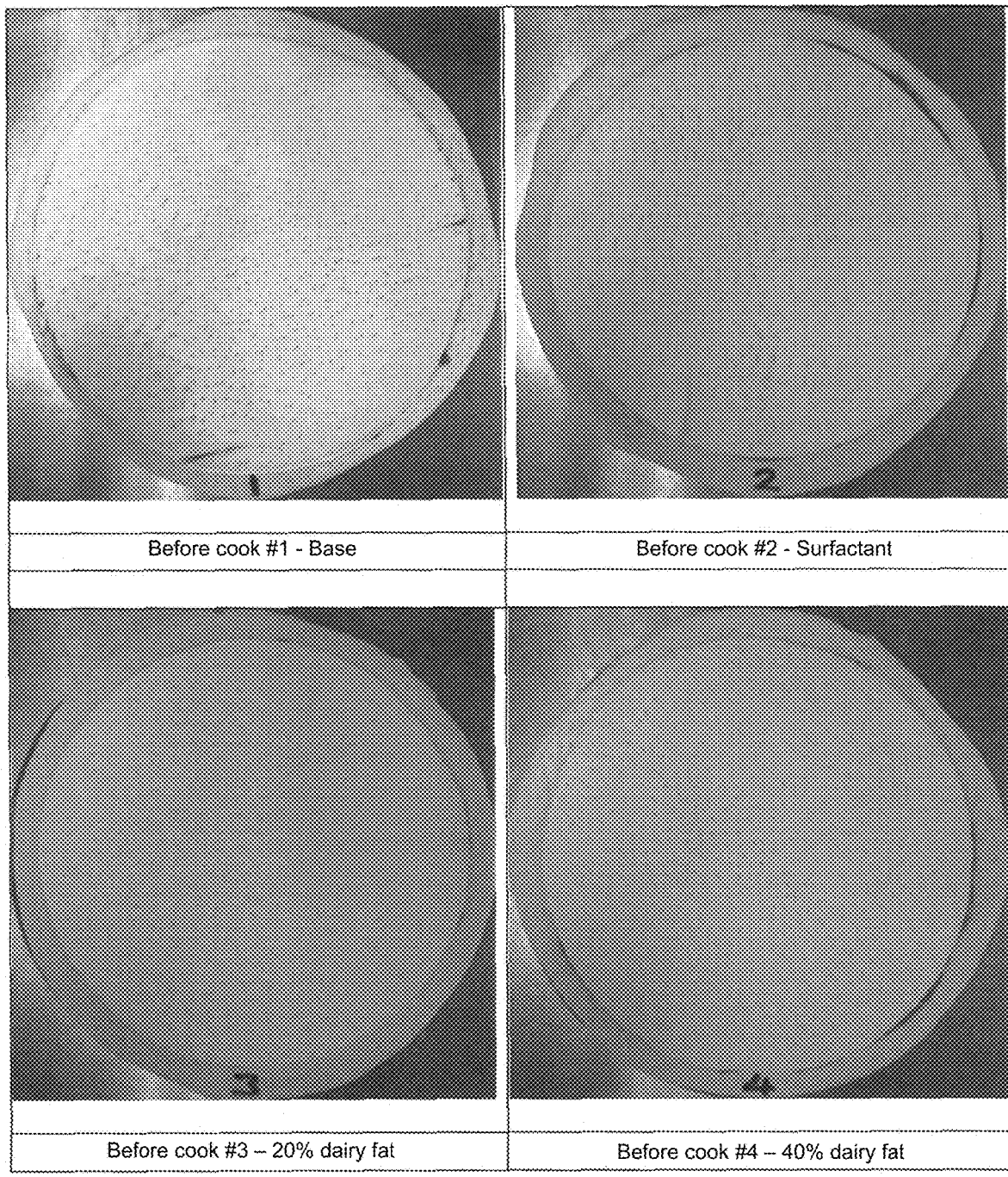
FIG. 9 shows images of cheese discs with different liquid applications before baking according to embodiments of the present technology.

The effect of different liquid application was tested for meltability, oil-off, blister size, and blister coverage on pizzas. The cheese disc was docked with small holes. These discs were either not treated with any liquid application, treated at a rate of 2.5% with surfactant solution (containing 0.2% surfactant), treated at a rate of 2.5% with dairy fat (containing 20% fat), or treated at a rate of 2.5% of a dairy fat (containing 40% fat). Frozen discs of cheese were prepared and then thawed under refrigerated condition for two days. The pizza crusts with cheese discs applied as prepared are shown in FIG. 9. The pizza was prepared by having the pizza dough sheeted, the sauce applied, and then the cheese disc applied onto the unbaked pizza. The pizza was cooked at 460° F. for 6.5 minutes in a conveyor oven. The pizzas were observed for melt quality and blister formation. The results are shown in Table 2 and in FIG. 10.

TABLE 2

Results of different liquid application treatments on pizza cheese discs.

| Pizza # | Docked | Holes (0.25 in) | Liquid application | Melt-ability | Oil-off | Blister size | Blister % coverage |
|---|---|---|---|---|---|---|---|
| 1 | Yes | None | None | Melted well | Medium | Equal mix of large, medium, and small | High—60% |
| 2 | Yes | None | 2.5% (0.2% surfactant solution) | Melted well | Medium | Mostly small, with some medium | Medium—40% |
| 3 | Yes | None | 2.5% (20% fat—dairy fat) | Melted well | Medium | Mostly small | Low—20% |
| 4 | Yes | None | 2.5% (40% fat—dairy fat) | Melted well | Medium | Mostly small, with some medium | Medium—40% |

Figure 10:
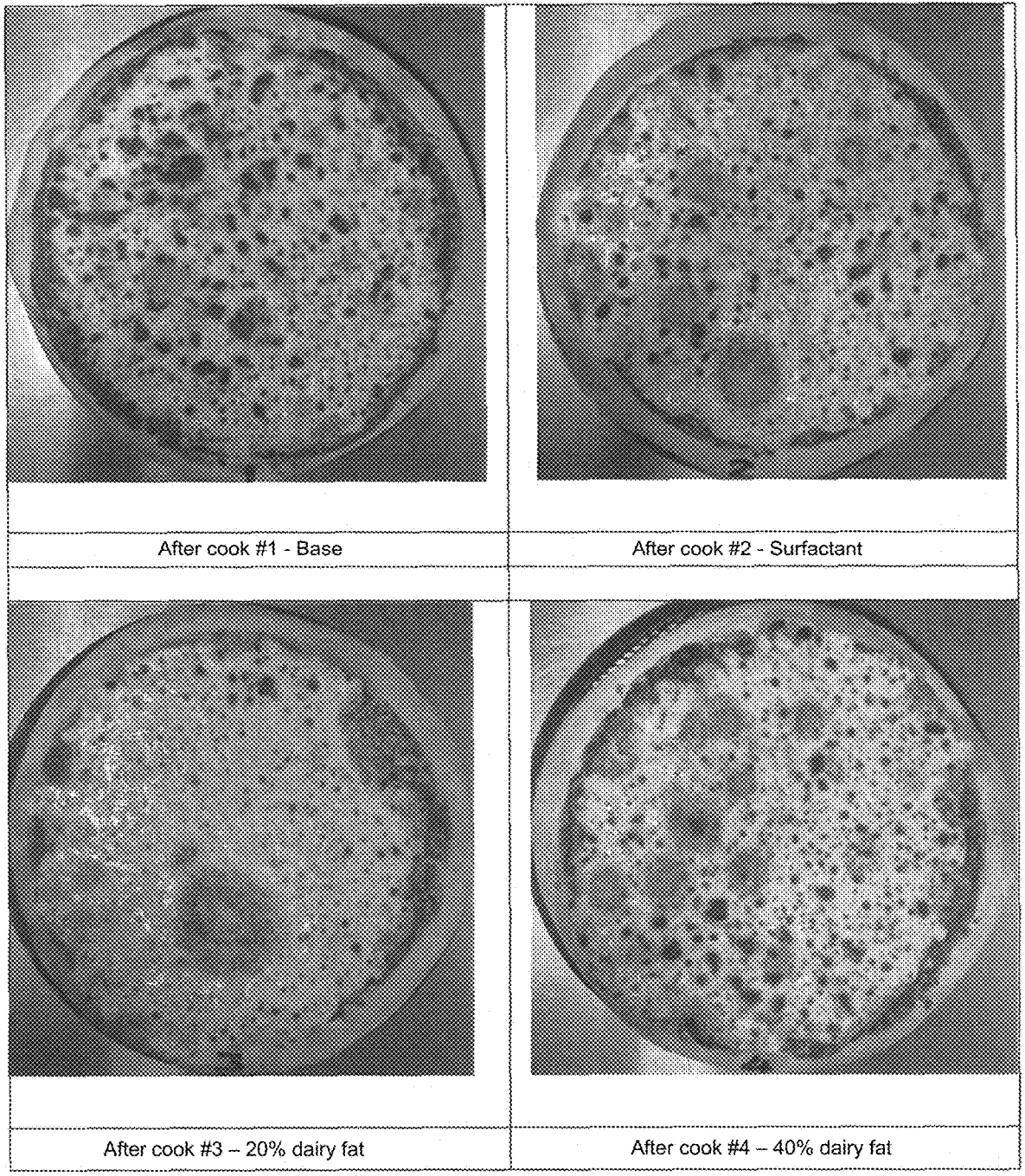
FIG. 10 shows images of cheese discs with different liquid applications after baking according to embodiments of the present technology.

The cheese melted well in all pizzas. The composition of the liquid application affected the blister size and the percent coverage. The base cheese disc without liquid application (pizza no. 1) had the highest blister percentage and more large size blisters than the others and would be deemed as unacceptable in overall performance. The disc with 20% dairy fat applied (pizza no. 3) had the lowest blister percentage and mostly small blister sizes. Pizza no. 3, as seen in FIG. 10, showed a dough bubble, which is not a blister but and not related to the analysis of the effectiveness of different treatments. The discs with surfactant or 40% dairy fat (pizza nos. 2 and 4) had moderate blister percentage and small to medium blister sizes. Overall pizza numbers 2, 3, and 4 in which docking and liquid application were used in preparing the cheese discs were the only pizzas with acceptable cheese performance in a baked pizza application.

EXAMPLE 4

The cheese from Example 1 was sheeted to 1/8 in and cooled to about 45° F. From the cooled cheese sheet, discs were cut from the cheese that measured 12 in in diameter.

Figure 11:
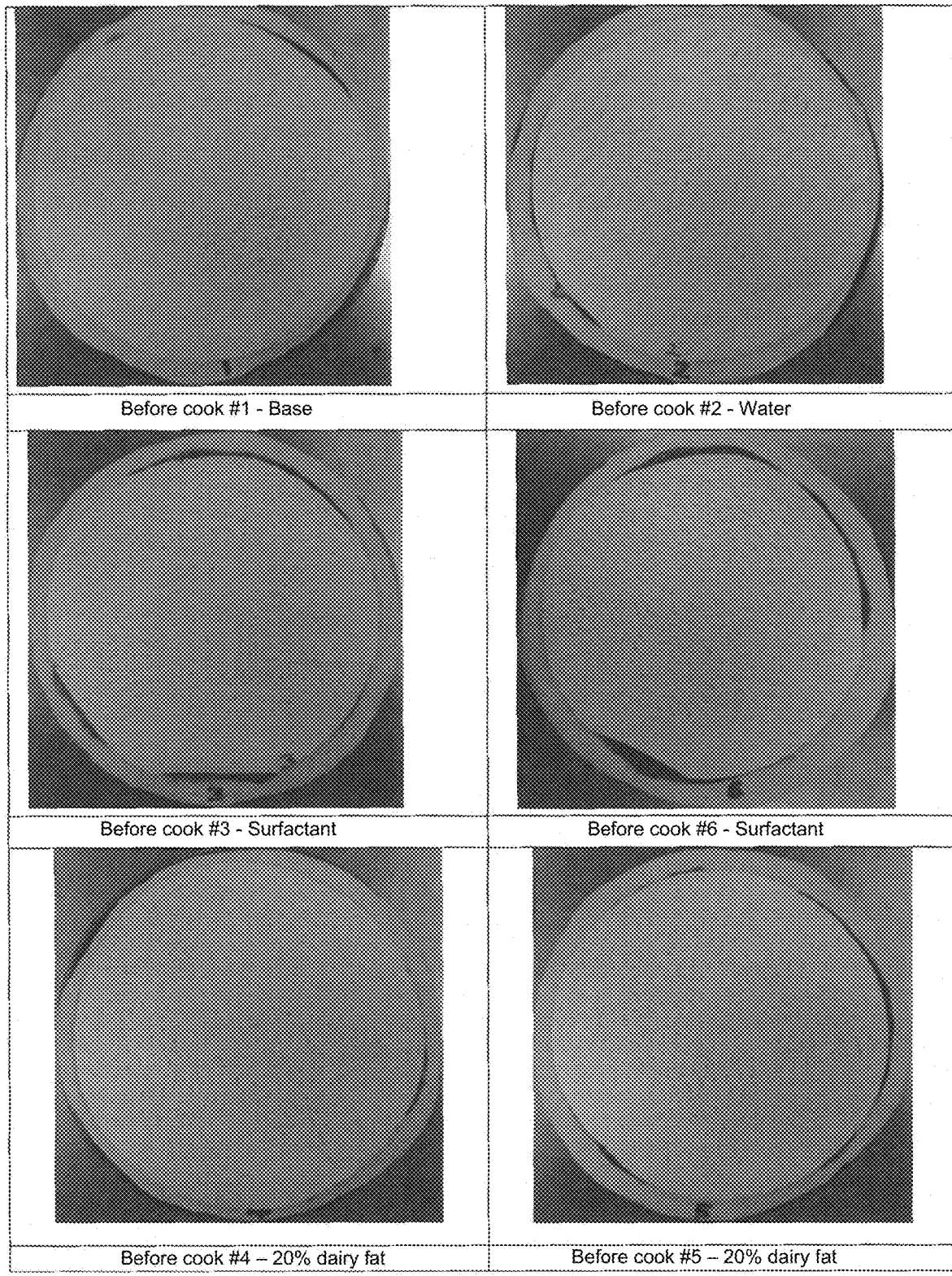
FIG. 11 shows images of cheese discs with different liquid applications before baking according to embodiments of the present technology.
Figure 12:
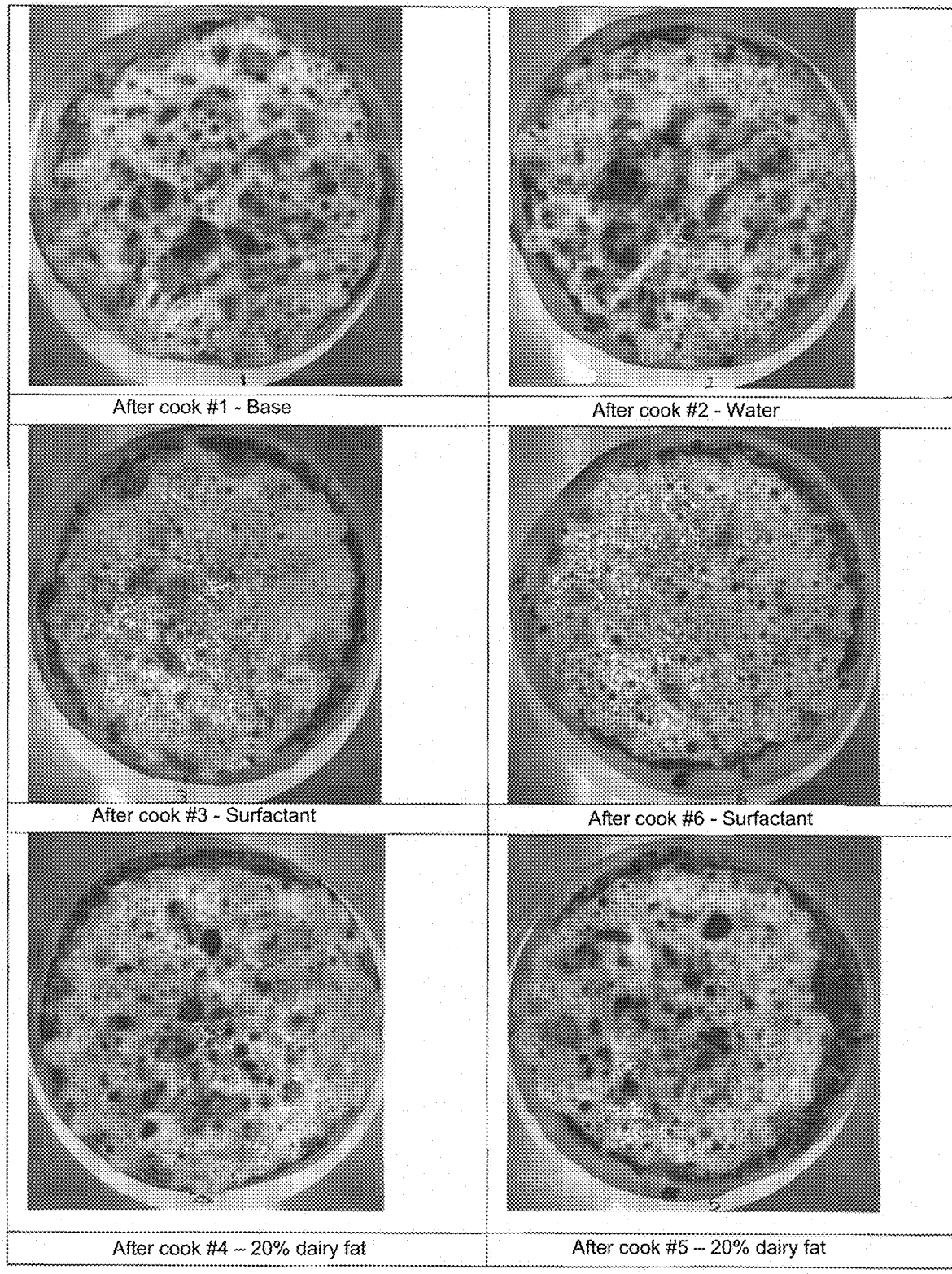
FIG. 12 shows images of cheese discs with different liquid applications after baking according to embodiments of the present technology.

The effect of different liquid application was tested for meltability, oil-off, blister size, and blister coverage on pizzas. The cheese disc was docked with small holes (1/64 to 1/16-inch. These discs were either not treated with any liquid application, treated with water at 2.5% rate, treated with surfactant solution (containing 200 ppm active surfactant) at 2.5% rate, or treated with dairy fat (20% fat) at 2.5% rate. Frozen discs of cheese were prepared and then thawed under refrigerated condition for two days. The cheese discs as prepared are shown in FIG. 11. The pizza was prepared by having the pizza dough sheeted, the sauce applied, and then the cheese disc applied onto the unbaked pizza. The pizza was cooked at 460° F. for 6.5 minutes in a conveyor oven. The pizzas were observed for melt quality and blister formation. The results are shown in Table 3 and in FIG. 12.

TABLE 3

Results of different liquid application treatments on pizza cheese discs.

| Pizza # | Docked | Holes (0.25 in) | Liquid application | Melt-ability | Oil-off | Blister size | Blister % coverage |
|---|---|---|---|---|---|---|---|
| 1 | Yes | None | None | Melted well | Low | Mostly large | High—70% |
| 2 | Yes | None | 2.5% (Water) | Melted well | Low | Mostly large | High—70% |
| 3 | Yes | None | 2.5% (surfactant solution) | Melted well | High | Mostly small and some medium | Low—30% |
| 6 | Yes | None | 2.5% (surfactant solution) | Melted well | High | Mostly small and some medium | Low—30% |
| 4 | Yes | None | 2.5% (20% fat—dairy fat) | Melted well | Medium | Mix of large, medium, and small | Medium—50% |
| 5 | Yes | None | 2.5% (20% fat—dairy fat) | Melted well | Medium | Mix of large, medium, and small | Medium—50% |

The cheese melted well in all pizzas. The composition of the liquid application affected the blister size and the percent coverage. The base cheese disc (pizza no. 1) had the highest blister percentage and more larger size blisters. The disc with water (pizza no. 2) appeared unchanged from the base cheese disc with similar blister percentage and similar size distribution of blisters. The discs with surfactant (pizzas no. 3 and no. 6) had the lowest blister percentage and mostly small blister sizes. The discs with 20% dairy fat (pizzas no. 4 and no. 5) had a moderate blister percentage and mixed blister sizes. These results indicated that the presence of liquid application using surfactant or dairy fat in the liquid application significantly impacted blister formation by reducing the size and the percentage of blisters, creating an overall acceptable appearance for the cheese disc when baked on pizza. The surfactant was more effective in reducing the blister formation than dairy fat. Furthermore, discs with 20% dairy fat (pizzas no. 4 and no. 5) had similar results as a disc treated with 40% dairy fat (pizza no. 3 in Example 3), indicating that the percent of fat in dairy fat has little effect on blister formation.

EXAMPLE 5

Figure 13:
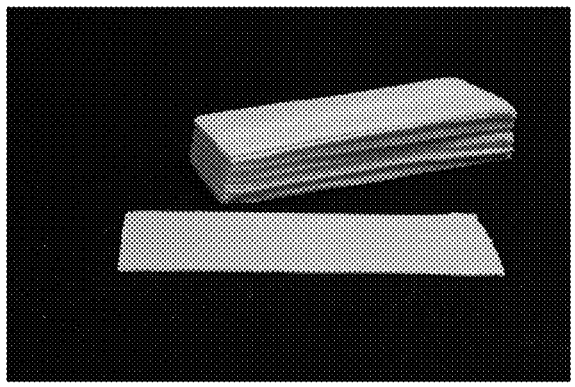
FIG. 13 shows images of cheese shapes according to embodiments of the present technology.
Figure 13:
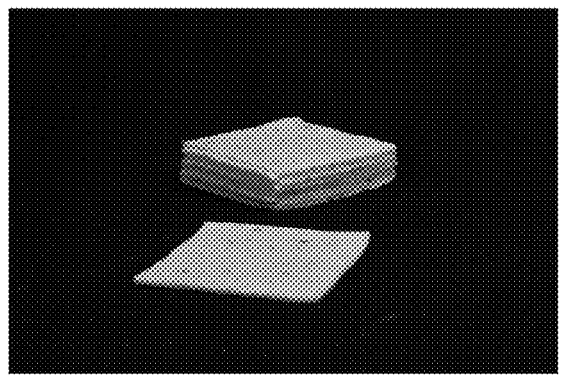
Figure 13:
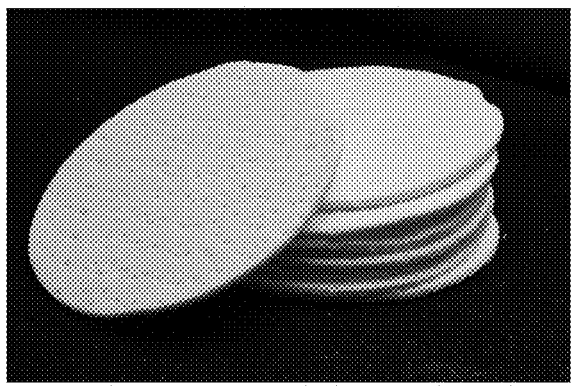
Figure 13:
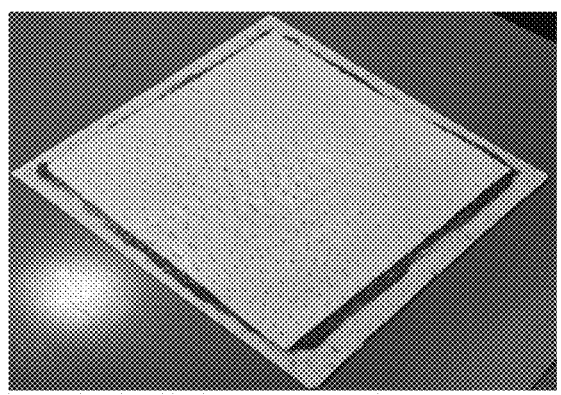
Figure 13:
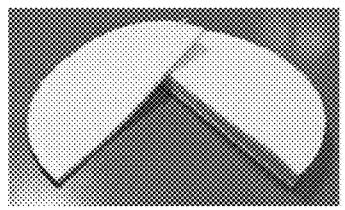
Figure 13:
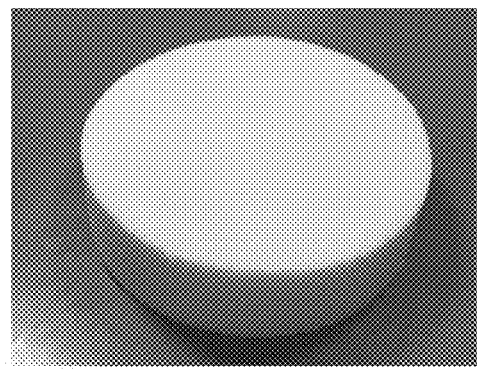

The cheese from Example 1 was formed into low-moisture, part skim mozzarella cheese slices ranging in thickness from 1/16 to 1.2 in. FIG. 13 shows different shapes of the cheese slices, including rectangles, squares, circles, and semi-circles. As can be seen from FIG. 13, the cheese shapes may be different thicknesses. Exemplary cheese shapes also include triangles (not shown in FIG. 13). In this example, the cheese slices differ from other cheese slices in that they have been formed in a continuous process by sheeting a cheese mass from which the cheese slices have been cut. In additional embodiments, the cheese slices may be combined with additional foods such as peppers. In still more embodiments, the cheese slices may be made from a cheese mass of processed cheese. The differences between the cheese slices made from a cheese mass of low-moisture, part skim mozzarella cheese and cheese slices made with a cheese mass of processed cheese are described in greater detail in Example 6.

EXAMPLE 6

Samples of cheeses were examined using fluorescent microscopy to show physical differences between low-moisture, part skim mozzarella cheese and processed cheese. Small cheese cubes (~5 mm in one dimension) were cut from a cheese slice and prepared in the direction of protein orientation (longitudinal). Cheese samples were frozen in a cryostat. Fifteen to twenty 30 μm sections were cut and discarded before taking a 7 μm section for analysis. The 7 μm sections were adhered to a microscope slide and stained with 0.01% Acid Fuchsin solution (protein stain) for 1.5 minutes, washed with deionized water, and stained with 0.01% Nile Blue A (fat stain) for 1 minute, washed, and then covered with a cover slip. Prepared specimens were examined at 200× magnification using a fluorescence microscope. Under fluorescent light, Acid Fuchsin fluoresces protein a reddish-orange, while Nile Blue A fluoresces fat a yellow-green color and water/whey shows up as black.

Figure 14A:
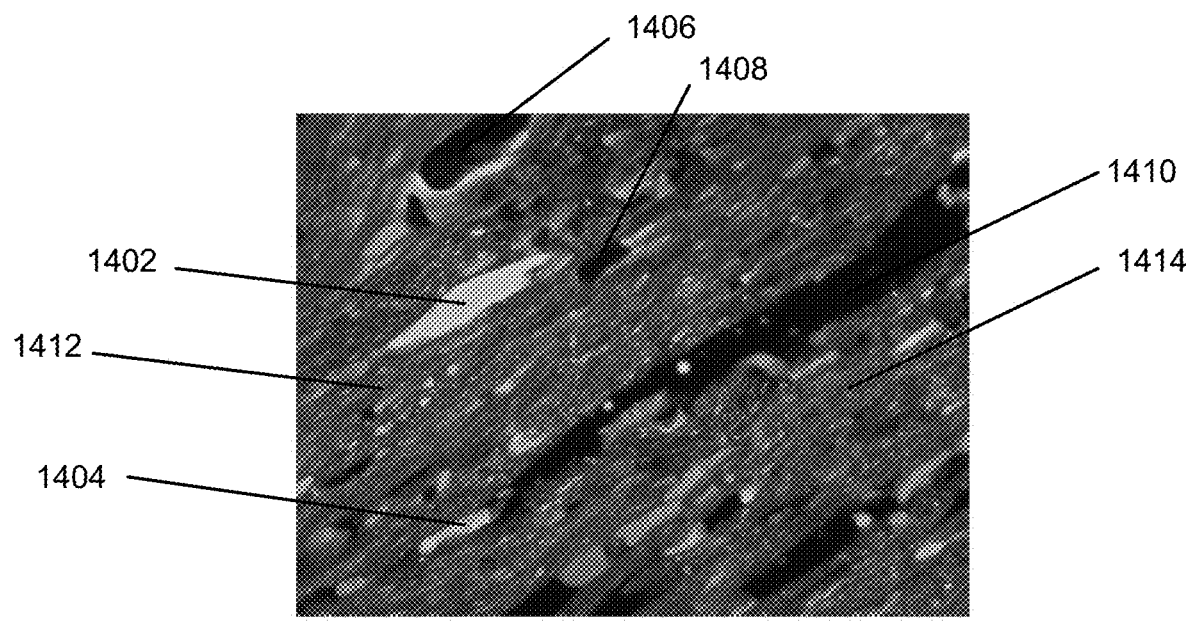
FIGS. 14A and 14B show fluorescent microscopy images of natural cheese and process cheese according to embodiments of the present technology.
Figure 14B:
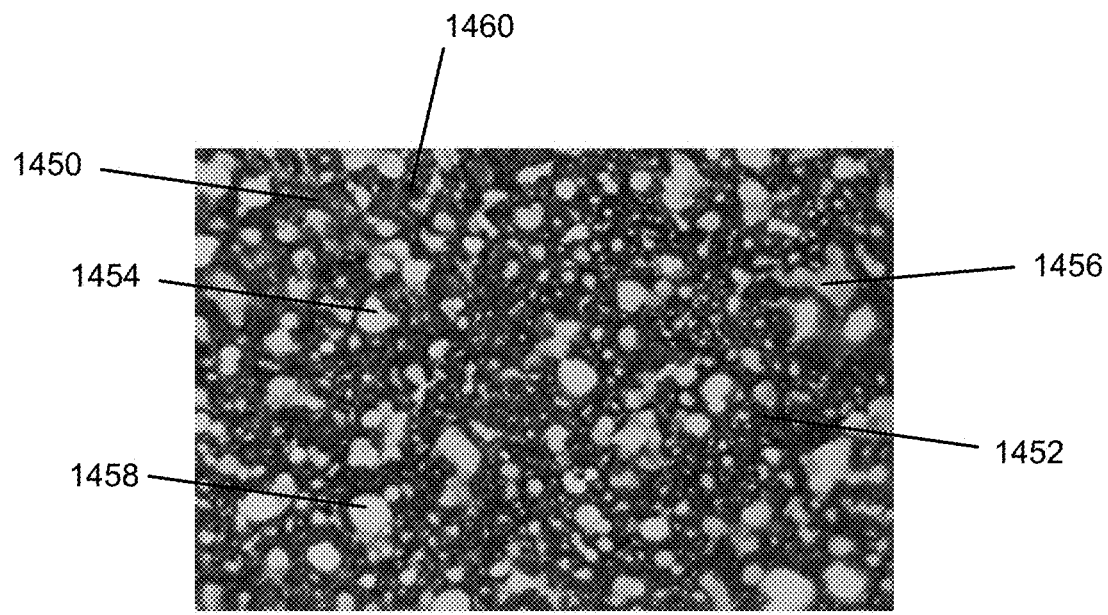

FIG. 14A and FIG. 14B show the differences between the cheese slices made by the present methods using cheese masses made of low-moisture, part skim mozzarella and processed cheese. FIG. 14A is an image of a low-moisture, part skim mozzarella cheese slice. The low-moisture, part skim mozzarella cheese slice was characterized by a three-dimensional network composed of overlapping and cross-linked chains of protein (casein). Moisture and fat, in the form of discrete or coalesced globules, were entrapped within the network. During manufacture of the low-moisture, part skim mozzarella cheese mass, cheese curd (pH 5.15 to 5.45) was placed in 150° F. to 160° F. water for about 3 minutes, and the curd was heated to around 130° F. to 150° F. The heated curd was kneaded in hot water and stretched in equipment that promotes extension of the molten curd. As seen in FIG. 14A, during heating and stretching microstructural changes occurred such that protein became aligned in long strands with pools of fat (e.g., sections 1402 and 1404) and water/whey (e.g., sections 1406, 1408, and 1410) accumulating between the protein fibers (e.g., sections 1412 and 1414). The fat and whey were compressed into column-like capillaries as the protein was packed together and drawn out in the stretcher.

The processed cheese slices were formed from a cheese mass heated between 158° F. and 208° F. and combined using high shear with a mixture of phosphate and citrate-containing emulsifying salts. The processed cheese mass manufacturing conditions contributes to the emulsification and uniform distribution of free fat droplets and emulsion stability throughout the processed cheese mass and subsequently formed processed cheese slice. The emulsion may be further stabilized by conversion of bulk phase water to monolayer and multilayer water that is more tightly bound.

As seen in FIG. 14B, the protein matrix strands in processed cheese slices (e.g. sections 1450 and 1452) were much finer than those in the low-moisture, part skim mozzarella cheese, and not aligned. The fat globules (e.g., sections 1454, 1456, and 1458) were uniform in size and shape, and along with the moisture (e.g., section 1460) were uniformly distributed within the protein matrix unlike in the low-moisture, part skim mozzarella cheese.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the cheese" includes reference to one or more cheeses and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a cheese shape, the method comprising:
   supplying a cheese-shaping system, wherein the cheese-shaping system comprises a first chilled roller belt and a second chilled roller belt aligned substantially parallel to the first chilled roller belt, and;
   providing a molten pasta filata cheese mass to a first gap formed between the first chilled roller belt and the second chilled roller belt;
   forming a cheese sheet from the molten pasta filata cheese mass in the first gap between the first chilled roller belt and the second chilled roller belt, wherein the first gap defines a first thickness of the cheese sheet in contact with both the first and the second chilled roller belts;
   cooling the cheese sheet to a temperature less than or about 45° F. through contact with the first and the second chilled roller belts;
   forming and removing the cheese shape from the cooled cheese sheet; and
   applying a liquid application to the cheese shape.

2. The method of claim 1, wherein the method further comprises docking the cheese sheet to form holes in the cheese sheet.

3. The method of claim 1, wherein the liquid application comprises an anti-sticking agent that permits adjacent pieces of stacked cheese shapes to be pulled apart without tearing.

4. The method of claim 1, wherein the liquid application comprises a functionality control agent.

5. The method of claim 1, wherein the cheese-shaping system comprises a third chilled roller belt aligned substantially parallel or in series to the first and second chilled roller belts, wherein a second gap is formed between the second and third chilled roller belts that defines a second thickness of the cheese sheet in contact with both the second and third chilled roller belts.

6. The method of claim 1, wherein the step of forming and removing the cheese shape from the cheese sheet comprises:
   stamping or rolling a cutter with an outline of the cheese shape into the cheese sheet, wherein the cutter forms the cheese shape independently of the cheese sheet; and
   separating the cheese shape from the cheese sheet.

7. The method of claim 1, wherein the step of forming and removing the cheese shape from the cheese sheet comprises:
   rolling a circular cutter into the cheese sheet to form the cheese shape, wherein:
      the cheese shape comprises two substantially straight lines intersecting at an angle.

8. The method of claim 1, wherein cheese scraps formed from the cheese sheet after the removing the cheese shape are added to the molten pasta filata cheese mass.

9. The method of claim 1, wherein the method further comprises freezing the cheese shape.

10. The method of claim 9, wherein the step of freezing the cheese shape comprises exposing the cheese shape to chilled air, wherein the chilled air freezes the cheese shape in about 10 minutes or less.

11. The method of claim 1, wherein the cheese shape is circular or elliptical.

12. The method of claim 11, wherein the cheese shape is a pizza cheese disc used on a pizza.

13. The method of claim 1, wherein the cheese shape is triangular, rectangular, square, or hexagonal.

14. The method of claim 13, wherein the cheese shape is a cheese slice used in a sandwich.

15. The method of claim 1, wherein the cheese sheet comprises a plurality of cheese fibers.

16. The method of claim 1, wherein the molten pasta filata cheese mass comprises a molten mozzarella cheese mass.

17. The method of claim 1, wherein the molten pasta filata cheese mass comprises a provolone cheese mass, a reduced fat, lowfat, or fat-free pasta filata cheese mass, a reduced fat, a lowfat or a fat-free pizza cheese mass, an analogue cheese mass, a cheddar cheese mass, or a Monterey jack cheese mass.

18. The method of claim 1, wherein the molten pasta filata cheese mass includes one or more additional ingredients or additional foods.

19. The method of claim 18, wherein the additional ingredients or additional foods comprise jalapeño pepper, peppers, oregano, tomato, meats, bacon, fish, spices, garlic, onion, cracked pepper, colored cheese bits, fruits, cranberries, apples, chocolate, red bean, sweet potato, jerky, sausage, vegetables, or combinations thereof.

20. A method of making cheese shapes, the method comprising:
   providing a pasta filata cheese mass to a gap formed between two chilled roller belts, wherein the two chilled roller belts are aligned substantially parallel to each other;
   moving the pasta filata cheese mass through the gap to form a cheese sheet;
   cooling the cheese sheet to a temperature less than or about 45° F. through contact with the two chilled roller belts;
   forming and removing the cheese shapes from the cheese sheet;
   docking the cheese shapes to form holes in the cheese shapes;
   freezing the cheese shapes to form frozen cheese shapes;
   applying a liquid application to the cheese shapes or the frozen cheese shapes; and
   stacking the frozen cheese shapes.

21. The method of claim 20, wherein the cheese shapes are circular or elliptical.

22. The method of claim 21, wherein the cheese shapes are pizza cheese discs used on one or more pizzas.

23. The method of claim 20, wherein the cheese shapes are rectangular, square or hexagonal.

24. The method of claim 23, wherein the cheese shapes are used in one or more sandwiches.

25. The method of claim 20, wherein the cheese shapes comprise mozzarella cheese.

26. The method of claim 20, wherein the cheese shapes comprise provolone cheese.

27. The method of claim 20, wherein the liquid application comprises a functionality control agent.

28. The method of claim 20, wherein the step of forming and removing the cheese shapes from the cheese sheet comprises:
   stamping or rolling a cutter with an outline of the cheese shapes into the cheese sheet, wherein the cutter forms the cheese shapes independently of the cheese sheet; and
   separating the cheese shapes from the cheese sheet.

29. The method of claim 20, wherein the freezing of the cheese shapes comprises exposing the cheese shapes to chilled air, wherein the chilled air freezes the cheese shapes in about 10 minutes or less.

* * * * *